US010814881B2

(12) United States Patent
Liu et al.

(10) Patent No.: US 10,814,881 B2
(45) Date of Patent: Oct. 27, 2020

(54) VEHICLE VELOCITY PREDICTOR USING NEURAL NETWORKS BASED ON V2X DATA AUGMENTATION TO ENABLE PREDICTIVE OPTIMAL CONTROL OF CONNECTED AND AUTOMATED VEHICLES

(71) Applicants: TOYOTA MOTOR ENGINEERING & MANUFACTURING NORTH AMERICA, INC., Plano, TX (US); THE REGENTS OF THE UNIVERSITY OF MICHIGAN, Ann Arbor, MI (US)

(72) Inventors: Kuan X. Liu, Ann Arbor, MI (US); Mike X. Huang, Ann Arbor, MI (US); Ilya V. Kolmanovsky, Novi, MI (US)

(73) Assignees: TOYOTA MOTOR ENGINEERING & MANUFACTURING NORTH AMERICA, INC., Plano, TX (US); THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 64 days.

(21) Appl. No.: 16/162,256

(22) Filed: Oct. 16, 2018

(65) Prior Publication Data

US 2020/0114926 A1    Apr. 16, 2020

(51) Int. Cl.
*B60W 40/105* (2012.01)
*B60W 50/00* (2006.01)
(Continued)

(52) U.S. Cl.
CPC ...... *B60W 40/105* (2013.01); *B60W 50/0097* (2013.01); *G05D 1/0088* (2013.01);
(Continued)

(58) Field of Classification Search
CPC ............ B60W 40/105; B60W 50/0097; G05D 1/0088; G05D 1/0221; G05D 2201/0213;
(Continued)

(56) References Cited

U.S. PATENT DOCUMENTS

2011/0040438 A1    2/2011  Kluge
2015/0344036 A1   12/2015  Kristinsson
(Continued)

FOREIGN PATENT DOCUMENTS

KR    101734267    2/2017

OTHER PUBLICATIONS

Jing et al., "Vehicle Speed Prediction using a Cooperative Method of Fuzzy Markov Model and Auto-regressive Model", IEEE Intelligent Vehicles Symposium (IV) Jun. 11-14, 2017.
(Continued)

*Primary Examiner* — Atul Trivedi
(74) *Attorney, Agent, or Firm* — Sheppard, Mullin, Richter & Hampton LLP; Hector A. Agdeppa; Daniel N. Yannuzzi

(57) ABSTRACT

Some implementations of the disclosure are directed to reducing or removing time lag in vehicle velocity prediction by training a model for vehicle velocity prediction using labeled features that provide indication of a feature associated with a vehicle acceleration or deacceleration event. In one implementation, a method includes: receiving multiple time series datasets, each of the time series datasets including sensor data, GPS data, and vehicle state data collected over time; extracting features from each of the time series datasets that are indicative of a future velocity of a vehicle; labeling the extracted features of each of the time series datasets to indicate vehicle acceleration or deacceleration events; and after labeling the extracted features of each of the time series datasets, using at least a subset of the
(Continued)

extracted and labeled time series datasets to train a machine learning model that predicts vehicle velocity some time into the future.

18 Claims, 18 Drawing Sheets

(51) Int. Cl.
| | | |
|---|---|---|
| G05D 1/00 | (2006.01) | |
| G06N 5/04 | (2006.01) | |
| G06N 3/08 | (2006.01) | |
| H04W 4/40 | (2018.01) | |
| G05D 1/02 | (2020.01) | |
| G06N 20/00 | (2019.01) | |

(52) U.S. Cl.
CPC ............. *G05D 1/0221* (2013.01); *G06N 3/08* (2013.01); *G06N 5/046* (2013.01); *G06N 20/00* (2019.01); *H04W 4/40* (2018.02); *G05D 2201/0213* (2013.01)

(58) Field of Classification Search
CPC ........... H04W 4/40; G06N 3/08; G06N 5/046; G06N 20/00
USPC .......................................................... 701/23
See application file for complete search history.

(56) References Cited

U.S. PATENT DOCUMENTS

| | | | |
|---|---|---|---|
| 2017/0101093 A1* | 4/2017 | Barfield, Jr. ..... | G08G 1/096775 |
| 2017/0316688 A1 | 11/2017 | Lai | |
| 2018/0170356 A1 | 6/2018 | Lee | |
| 2018/0183650 A1* | 6/2018 | Zhang .................. | G01S 13/003 |
| 2018/0374359 A1* | 12/2018 | Li ............................ | G06N 3/08 |
| 2019/0077398 A1* | 3/2019 | Kusano ........... | B60W 30/18163 |
| 2019/0102840 A1* | 4/2019 | Perl ........................ | G06Q 20/08 |
| 2019/0235499 A1* | 8/2019 | Kazemi ............. | B60W 30/0956 |
| 2019/0259182 A1* | 8/2019 | Sarukkai ............. | G06N 3/0445 |
| 2019/0324431 A1* | 10/2019 | Cella .................. | G05B 23/0221 |
| 2019/0370575 A1* | 12/2019 | Nandakumar ..... | G01C 21/3438 |
| 2019/0377351 A1* | 12/2019 | Phillips ................ | G05D 1/0217 |
| 2019/0391581 A1* | 12/2019 | Vardaro .............. | A61B 5/0205 |
| 2020/0139959 A1* | 5/2020 | Akella ................. | G05D 1/0214 |
| 2020/0139967 A1* | 5/2020 | Beller ................. | B60W 30/143 |

OTHER PUBLICATIONS

Lefèvre et al., "Comparison of Parametric and Non-Parametric Approaches for Vehicle Speed Prediction", American Control Conference, Jun. 4-6, 2014.

Lemieux et al., "Vehicle Speed Prediction Using Deep Learning", IEEE Vehicle Power and Propulsion Conference, pp. 1-5, 2015.

Moser et al., "Short Term Prediction of a Vehicle's Velocity Using ITS," SAE International Journal of Passenger Cars—Electronic and Electrical Systems, 2015.

Mozaffari et al., "Vehicle Speed Prediction via a Sliding-Window Time Series Analysis and an Evolutionary Least Learning Machine: A Case Study on San Francisco Urban Roads", Internal Journal, Engineering Science Technology, vol. 18, No. 2, pp. 150-162, 2015.

Sun et al., "Integrating Traffic Velocity Data into Predictive Energy Management of Plug-In Hybrid Electric Vehicles", American Control Conference, 2015.

Wang et al., "The Effectiveness of Data Augmentation in Image Classification using Deep Learning", cs231n.stanford.edu/reports/2017/pdfs/300.pdf.

Zhang et al., "Real-Time Energy Management Strategy Based on Velocity Forecasts Using V2V and V2I Communications", IEEE Transactions on Intelligent Transportation Systems, 18, 416-430, 2017.

* cited by examiner

VEHICLE VELOCITY PREDICTOR USING NEURAL NETWORKS BASED ON V2X DATA AUGMENTATION TO ENABLE PREDICTIVE OPTIMAL CONTROL OF CONNECTED AND AUTOMATED VEHICLES

DESCRIPTION OF RELATED ART

The Intelligent Transportation System (ITS) has been leading a revolution in the automotive industry to make safer and smart use of transport networks. ITS applications cover but are not limited to Advanced Driver Assistance Systems (ADAS), Vehicle-to-Vehicle (V2V) and Vehicle-to-Infrastructure (V2I) communication. Such applications aim to yield significant improvements in fuel economy (FE), transportation conditions and safety. ITS applications commonly rely on the prediction of future vehicle velocity and local traffic conditions. For example, the prediction of vehicle velocity may be used to optimize energy management strategy in order to improve FE and to reduce emissions. Also, the prediction of future vehicle velocity may help avoid accidents by predicting future vehicle collisions. However, the prediction accuracy may be highly dependent on the prediction scheme that is used.

As such, there is a need to develop accurate and robust approaches for predicting vehicle velocity to enhance fuel economy, energy efficiency, drivability and safety of automotive vehicles. Generally, vehicle velocity prediction methods aim to minimize mean absolute (MAE) and root mean square error (RMSE) between predicted and actual velocity results to assess a prediction algorithm.

BRIEF SUMMARY OF THE DISCLOSURE

Implementations of the disclosure are directed to reducing or removing time lag in vehicle velocity prediction by training a model for vehicle velocity prediction using labeled features that provide indication of a feature associated with a vehicle acceleration or deceleration event.

In one embodiment, a method includes: receiving a plurality of time series datasets, each of the plurality of time series datasets including sensor data, global positioning system (GPS) data, and vehicle state data collected over time during a vehicle trip; extracting features from each of the plurality of time series datasets that are indicative of a future velocity of a vehicle, the extracted features comprising the sensor data, the GPS and the vehicle state data; labeling the extracted features of each of the plurality of time series datasets to indicate vehicle acceleration or deceleration events; and after labeling the extracted features of each of the plurality of time series datasets to indicate vehicle acceleration or deceleration events, using at least a subset of the extracted and labeled time series datasets to train a machine learning model that predicts vehicle velocity some time into the future.

In some implementations, labeling the extracted features, includes: creating a time series vector including a plurality of values corresponding to a respective time, or creating a location series vector comprising a plurality of values corresponding to a respective location, where each of the plurality of values of the time series vector or location series vector indicates one of the following: i) an acceleration event is present; ii) a deceleration event is present; or iii) no acceleration or deceleration event is present. In particular implementations, labeling the extracted features comprises: creating a location series vector comprising a plurality of values corresponding to a respective GPS longitudinal and latitudinal position, wherein each of the plurality of values of the location series is normalized to 1, 0, or −1 to indicate one of the following: an acceleration event is present; a deceleration event is present; or no acceleration or deceleration event is present. In particular implementations, labeling the extracted features comprises: creating a time series vector comprising a plurality of values corresponding to a respective time.

In implementations, labeling the extracted features of each of the plurality of time series datasets to indicate vehicle acceleration or deceleration events, includes: labeling the extracted features to indicate one or more of the following events: a vehicle beginning its drive, a vehicle ending its drive, a stop sign, a traffic light, a street corner, a highway corner, and a road having a particular radius of curvature.

In implementations, the method further includes: after labeling the extracted features of each of the plurality of time series datasets, splitting the extracted and labeled time series datasets into a training dataset and a testing dataset, where the extracted and labeled time series datasets of the training dataset are used to train the machine learning model; and after training the machine learning model, testing the trained machine learning model using at least the extracted and labeled time series datasets of the testing dataset, where testing the trained machine learning model includes comparing target vehicle velocities against vehicle velocities predicted by the trained model. In some implementations, testing the machine learning model includes measuring a time shift between the target vehicle velocities and the vehicle velocities predicted by the trained model. In particular implementations, the time shift is measured based on:

$$\text{time shift} = \arg\min_{\delta} \; MAE(Y_{t-\delta}, T_t),$$

where δ represents a time shift of a predicted vehicle velocity time series, and wherein MAE represents a mean absolute error given by:

$$MAE(Y_t, T_t) = \frac{\sum_{i=1}^{n} |y_i - t_i|}{n},$$

where $y_1, \ldots, y_n$ are vehicle velocities predicted into the future n times using the machine learning model, and $t_1, \ldots, t_n$ are measured vehicle velocities (targets) corresponding to the times when the vehicle velocities are predicted.

In particular implementations, the machine learning model trained to predict vehicle velocity some time into the future comprises a nonlinear auto-regressive with external input shallow neural network model. In particular implementations, the machine learning model trained to predict vehicle velocity some time into the future comprises a long short-term memory (LSTM) deep neural network model.

In implementations, the method further includes: configuring a control unit of a vehicle to use a prediction algorithm corresponding to the trained and tested machine learning model to predict vehicle velocity 1 to 10 seconds into the future while driving.

In implementations, the control unit is configured to receive as inputs to the prediction algorithm: GPS data collected by a GPS unit of the vehicle; sensor data of preceding traffic collected by a preceding traffic sensor (e.g., LIDAR, RADAR, camera, ultrasonic sensor, etc.) of the vehicle; vehicle state data collected by one or more vehicle state sensors of the vehicle; and labels providing an indication of an acceleration or deceleration event at a particular time or location.

In implementations, the method further includes: the electronic control unit of the vehicle extracting from stored map data the labels that are inputs to the prediction algorithm that provide an indication of an acceleration or deceleration event.

In implementations, the method further includes: the electronic control unit of the vehicle dynamically generating the labels that are inputs to the prediction algorithm that provide an indication of an acceleration or deceleration event.

In one embodiment, a vehicle includes: a GPS sensor; a vehicle state sensor; a preceding traffic sensor to collect data of traffic preceding the vehicle; and an electronic control unit to iterate operations of: receiving GPS data generated using the GPS sensor; receiving vehicle state sensor data generated using the vehicle state sensor; receiving preceding traffic data generated using the preceding traffic sensor; obtaining labels providing an indication of an acceleration or deceleration event at a particular time or location; and providing the received GPS data, received vehicle state sensor data, received preceding traffic data, and obtained labels as an input to a vehicle velocity prediction algorithm corresponding to a trained and tested vehicle velocity prediction model; and predicting vehicle velocity some time into the future using the vehicle velocity prediction algorithm. In implementations, obtaining labels providing an indication of an acceleration or deceleration event at a particular time or location, includes: the electronic control unit of the vehicle extracting the labels from stored map data; or the electronic control unit of the vehicle dynamically generating the labels.

Other features and aspects of the disclosed technology will become apparent from the following detailed description, taken in conjunction with the accompanying drawings, which illustrate, by way of example, the features in accordance with implementations of the disclosed technology. The summary is not intended to limit the scope of any inventions described herein, which are defined by the claims and equivalents.

It should be appreciated that all combinations of the foregoing concepts (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

It should be noted that the terms "optimize," "optimal" and the like as used herein can be used to mean making or achieving performance as effective or perfect as possible. Moreover, techniques disclosed herein can refer to, e.g., performing calculations, etc. that result in "more accurate" determinations. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

As noted above, there is a need to develop accurate and robust approaches for predicting vehicle velocity. Although some progress has been made in vehicle velocity prediction, there still exist some problems. A common problem is that vehicle velocity prediction methods only produce good results when a vehicle operates in a steady state (i.e., velocity does not change over time). However, for transient states (e.g., sudden changes in vehicle velocity due to acceleration and deceleration events), vehicle velocity prediction methods typically generate poor results.

One of the reasons for the poor performance of such velocity prediction methods is that they generally only aim to minimize mean absolute (MAE) and root mean square error (RMSE) between predicted and actual velocity results to assess a prediction algorithm. However, these methods for vehicle velocity prediction do not consider time lag in vehicle velocity prediction. Generally speaking, when historical data is used to predict future data, the predictions will frequently appear to lag the actual results. In some instances, the amount of time taken to generate an estimate of the future vehicle velocity by known vehicle velocity prediction methods will approach the time in the future for which vehicle velocity prediction is desired.

Figure 1:
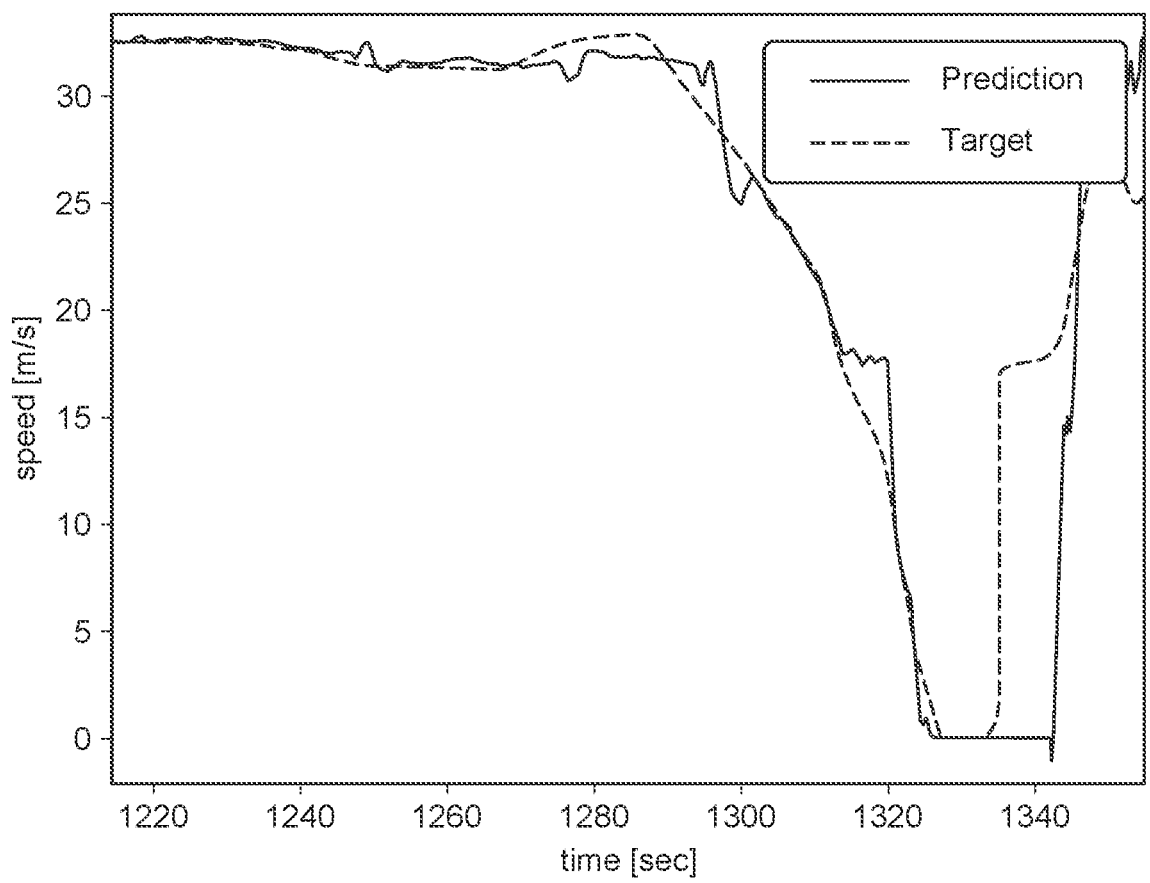
FIG. 1 shows a vehicle velocity prediction versus vehicle speed measurement (target) time series plot illustrating the time lag problem in vehicle velocity prediction.

For instance, FIG. 1 shows a vehicle velocity prediction versus vehicle speed target time series plot illustrating the time lag problem. In this plot, the target speed curve represents a vehicle's actual recorded speed over time, and the prediction speed curve represents a vehicle's predicted speed using a method that does not account for time lag. As illustrated, although the predicted curve closely follows the target curve during steady state speeds (e.g., from 1220 to 1260 seconds), the time lag of the predicted time series curve relative to the target time series curve becomes apparent during acceleration and deceleration events, especially from 1330 to 1340 seconds. Although the overall MAE of the prediction curve for this example may be relatively small (e.g., due to the vehicle operating in a relatively steady state for more than half of the time period), the prediction method does not perform well during transient velocities.

As such, there is a need to consider time lag in vehicle velocity prediction. To this end, implementations of the disclosure are directed to reducing or removing time lag in vehicle velocity prediction results by training a machine learning algorithm for vehicle velocity prediction using labeled features, where the labels provide an indication of a feature associated with a vehicle acceleration or deceleration event. In accordance with implementations, labels may be used to indicate one or more of the following acceleration or deceleration events: a vehicle beginning its drive, a vehicle ending its drive, a stop sign, a traffic light, a street or highway corner, and other events that provide an indication that a vehicle will accelerate or deaccelerate. Specific implementations described herein are directed to using labeled features as inputs to a neural network to predict vehicle velocity 1 to 10 seconds into the future. As further described herein, by virtue of labeling features used to predict vehicle velocity to indicate acceleration or deceleration events, significant improvement in vehicle velocity prediction for transient velocity scenarios may be obtained.

Figure 2A:
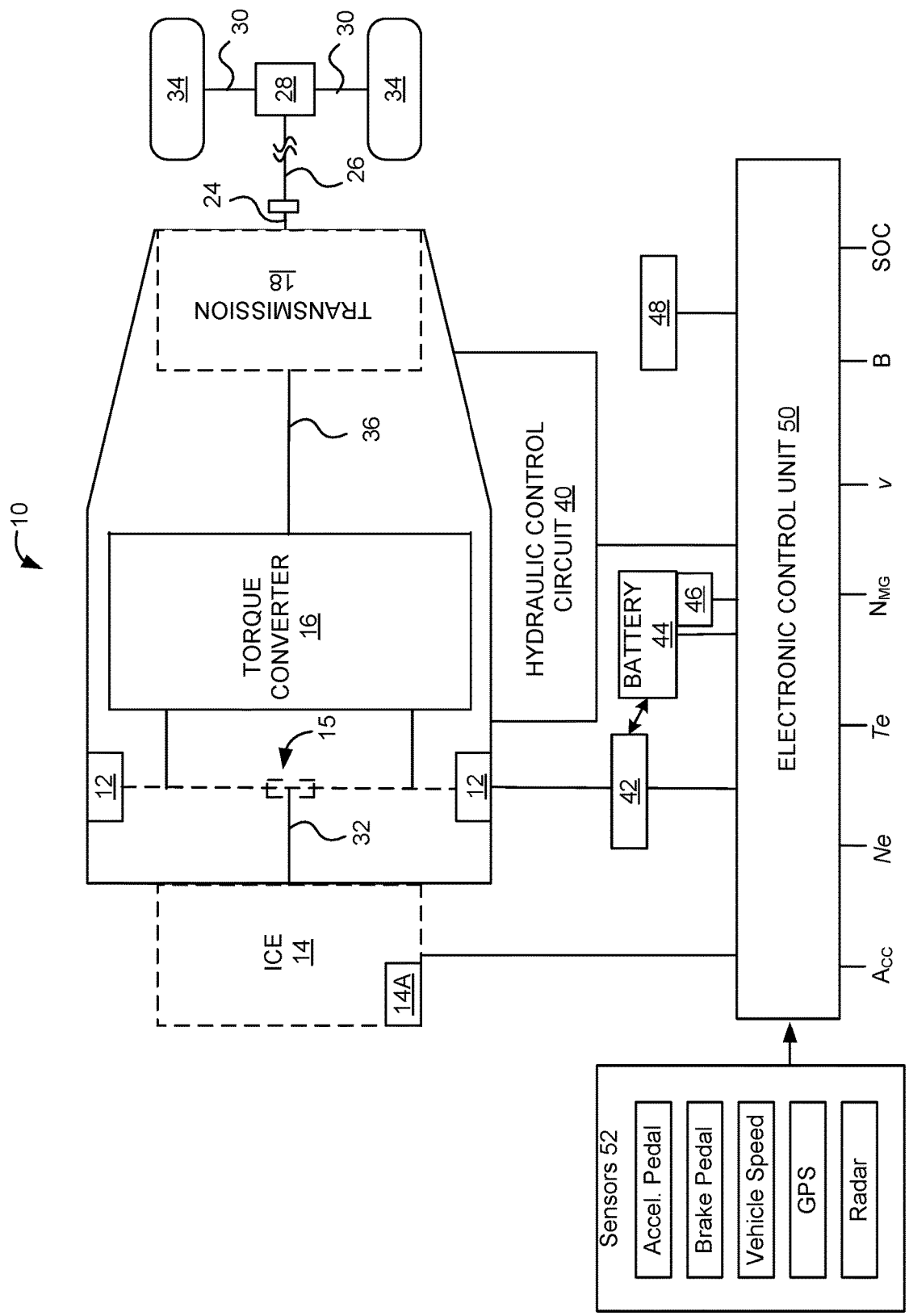
FIG. 2A is a schematic representation of an example hybrid electric vehicle in which vehicle velocity prediction may be implemented in accordance with the disclosure for power split control.

Before describing implementations of the vehicle velocity prediction techniques in further detail, it is instructive to describe a vehicle with which such implementations may be used. FIG. 2A is a schematic representation of an example hybrid electric vehicle (HEV) 10 in which vehicle velocity prediction may be implemented in accordance with the disclosure for power split control. For example, HEV 10 may be used to gather a training dataset with features that are extracted and labeled to train a machine learning model to predict future vehicle velocity. Additionally, HEV 10 may use a model learned in accordance with the disclosure to predict future vehicle velocities while driving.

It should be noted that while FIG. 2A illustrates one example vehicle (HEV) and one example application (power split control) with which vehicle velocity prediction may be used, the vehicle velocity prediction techniques described herein may be used in other vehicles (e.g., internal combustion engine vehicles, fully electric vehicles, etc.) and for other applications (e.g., assisted driving, full self-driving, collision avoidance, etc.). It should also be noted that while FIG. 2A illustrates one example HEV having a particular power train configuration with which embodiments may be implemented, the technology described herein may implemented in HEV's having other power train configurations. For example, the technology disclosed herein may be implemented in HEVs having a one-motor system, a two-motor system, or a system with more than two motors. Additionally, the technology disclosed herein may be implemented in HEVs having other gear sets such as a planetary gear set.

It should be noted that for clarity of the illustration, not all elements of HEV 10 are labeled with a reference numeral. For example, in some cases, only one of two or more elements or components of HEV 10 are labeled with a reference numeral. However, it can be assumed that the functionality and/or operation of similarly-illustrated elements or components are the same or similar, as would understood by those of ordinary skill in the art unless described otherwise. Moreover, aspects of HEV 10 may be described from the perspective of one/one set of elements or components. It can be assumed that secondary instances of those elements or components may operate the same or in a similar manner. It should also be noted that for ease of description and clarity of figures, not all components of a HEV have been illustrated, and that the figures and corresponding descriptions are not meant to be limiting. It should be further noted that a HEV may embody certain variations with respect to its elements or components, which are contemplated herein. For example, HEV 10 may be configured with only a single motor.

FIG. 2A illustrates example components of a HEV 10 that may include an engine 14 and a motor 12 as drive sources. Driving force generated by the engine 14 and the motor 12 can be transmitted to a pair of wheels 34 via a torque converter 16, an automatic transmission 18, a differential gear device 28, and a pair of axles 30. Each of the motor 12, the torque converter 16, and the automatic transmission 18 can be housed in a transmission case. The transmission case may be a splittable case made of aluminum die cast parts, for example, and fixed to a non-rotating member such as a vehicle body.

HEV 10 may be driven/powered with at least one of the engine 14 and the motor 12 as the drive source for travel. In other words, any one of a plurality of travel modes can be selectively established in the HEV 10. A first travel mode may be an engine-only travel mode that only uses the engine 14 as the drive source for travel. A second travel mode may be an EV travel mode that only uses the motor 12 as the drive source for travel. A third travel mode may be a hybrid travel mode that uses the engine 14 and the motor 12 as drive sources for travel. In the engine-only and hybrid travel modes, HEV 10 travels by using the driving force generated at least by engine 14 while a clutch 15 is engaged. In EV travel mode, HEV 10 travels by using the driving force generated by motor 12 while the engine 14 is stopped and clutch 15 is disengaged.

Engine 14 may be an internal combustion engine such as a gasoline engine or a diesel engine of an in-cylinder injection type, where fuel is injected directly into a combustion chamber. An output control device 14A is provided to control drive (output torque) of the engine 14. The output control device 14A may include a throttle actuator that controls opening and closing of an electronic throttle valve, a fuel injection device that controls fuel injection, an ignition device that controls ignition timing, and the like. The output control device 14A may execute output control of engine 14 according to a command control signal(s) supplied from an electronic control unit 50 described below. Such output control can include, for example, control of opening and closing of the electronic throttle valve by the throttle actuator for throttle control. Output control may also include control of fuel injection by the fuel injection device for fuel injection control. Further still, output control may include control of the ignition timing of the ignition device for ignition timing control.

A transmission input shaft 36 may transfer power from motor 12 and/or engine 14 to automatic transmission 18 to which a transmission output shaft 24 is attached. Connected to transmission output shaft 24 is a propeller shaft 26 coupled to differential gear device 28. Automatic transmission 18 can be a stepped transmission mechanism that selectively establishes any of a plurality of predetermined gears (gear ratios), for example, and is configured to include a plurality of engagement elements to perform such gear ratio changes. Automatic transmission 18 can include a plurality of hydraulic frictional engagement devices, such as multiple disc clutches and brakes whose engagement is controlled by a hydraulic actuator. These hydraulic frictional engagement devices may be selectively engaged or disengaged according to the hydraulic pressure supplied from hydraulic control circuit 40. Accordingly, any of a plurality of forward gears (i.e., forward gear positions or forward travel gear positions) or reverse gears (i.e., reverse gear positions or reverse travel gear positions) can be selectively established according to a combination of coupling states of the hydraulic frictional engagement devices. For example, the coupling states of the hydraulic frictional engagement devices can allow for upshifting and downshifting between the forward and reverse gears.

Motor 12 may include a rotor and stator. Motor 12 can be a motor generator that functions as a motor that generates driving force and a generator that generates reaction force. The motor 12 may be connected to a power storage device, such as a battery 44 and a capacitor via an inverter 42. The electronic control unit 50 described below may control inverter 42, adjust driving current supplied to or received from coils of the motor 12, and control driving of the motor 12. That is, output torque of the motor 12 can be increased or decreased by electronic control unit 50 through the inverter 42.

In a power transmission path between engine 14 and motor 12, clutch 15 controls power transmission in the power transmission path according to an engagement state. That is, a crankshaft 32 that is an output member of the engine 14 is selectively coupled to a rotor of the motor 12 via clutch 15. Clutch 15 is, for example, a multiple disc type hydraulic frictional engagement device whose engagement is controlled by a hydraulic actuator. Clutch 15 is controlled such that its engagement state is controlled to achieve engagement (complete engagement), slip engagement, and disengagement (complete disengagement) modes according to hydraulic pressure supplied from the hydraulic control circuit 40. That is, a torque capacity of clutch 15 is controlled according to the hydraulic pressure supplied from the hydraulic control circuit 40. When clutch 15 is engaged, power transmission is provided in the power transmission path between the crankshaft 32 and the front cover of the torque converter 16. On the other hand, when clutch 15 is disengaged, power transmission is blocked from being delivered to the power transmission path between the crankshaft 32 and the front cover of the torque converter 16. In a slip engagement state or mode, clutch 15 is engaged, and power transmission according to a torque capacity (transmission torque) of the clutch 15 is provided to the power transmission path between the crankshaft 32 and the front cover of the torque converter 16.

HEV 10 may include an electronic control unit 50. Electronic control unit 50 may include a microcomputer that includes a CPU, a RAM, a ROM, an input-output interface, and the like. In electronic control unit 50, the CPU may utilize a temporary storage function of the RAM to perform signal processing according to a program stored in the ROM. Accordingly, the electronic control unit 50 may execute various kinds of control such as drive control of the engine 14, drive control of the motor 12, speed change control of the automatic transmission 18, engagement force control of the clutch 15, engagement control of the lock-up clutch 38, and the like. These control functions may be performed in accordance with a power split control algorithm that considers predicted future velocities. The electronic control unit 50 may be separately configured with a plurality of control devices such as for control of the engine 14, control of the motor 12, control of the automatic transmission 18, and control of the clutch 15 according to necessity and may execute each control through communication of information with each other. In this embodiment, the electronic control unit 50 corresponds to the control device of the HEV 10.

As shown in FIG. 2A, the electronic control unit 50 is supplied with various kinds of input signals detected by each sensor provided in the HEV 10. For example, electronic control unit 50 may receive signals that indicate an accelerator operation amount $A_{CC}$, a revolution speed $N_E$ of the engine 14 (engine revolution speed), a rotational speed $N_T$ of the turbine wheel 16B (turbine rotational speed), a rotational speed $N_{MG}$ of the motor 12 (motor rotational speed), a vehicle speed V, and energy storage amount (remaining capacity, charged amount), e.g., battery SOC of battery 44. It should be noted that more signals indicative of other operational aspects of HEV 10 can be received by electronic control unit 50, e.g., a temperature of motor 12, coolant temperature of HEV 10, intake air amount of engine 14, etc.

Electronic control unit 50 can receive the input signals from various sensors 52 configured to sense relevant operational characteristics of HEV 10, the route HEV 10 is taking, and/or the road HEV 10 is currently driving on. For example, accelerator operation amount $A_{CC}$ can be detected by an accelerator operation amount sensor that determines the degree to which an accelerator pedal is depressed/actuated. For example, brake operation amount B can be detected by a foot brake sensor. For example, engine revolution speed $N_e$ can be detected by an engine revolution speed sensor. The engine torque $T_e$ can be detected by an engine torque sensor. The motor rotational speed $N_{MG}$ can be detected by a motor rotational speed sensor. Vehicle speed v can be detected by a vehicle speed sensor. Battery SOC can be detected by an SOC sensor 46.

Another example of a sensor 52 may be a positioning or location sensor, such as a Global Positioning System (GPS) receiver that can provide location information corresponding to a location of HEV 10. Additionally, a sensor 52 that provides positioning or location information may provide traffic information for a current location of HEV 10 and an expected route of HEV 10. Additionally, electronic control unit 50 can receive input signals from a network interface device 48. Network interface device 48 may receive information such as map data, road conditions information, traffic information, and the like from one or more information service providers. For example, such information may be retrieved using vehicle-to-vehicle (V2V) communications, vehicle-to-infrastructure (V2I) communications, and/or vehicle-to-cloud (V2C) communications. Instead of relying solely on a GPS receiver, a location of HEV 10 may be determined from information received by network interface device 48.

A further example of a sensor 52 may be a radar sensor that uses a radar transceiver to emit/receive radio waves to calculate the relative distance and/or velocity between the vehicle and other surrounding objects such as other vehicles.

Electronic control unit 50 can supply various output signals to one or more devices/components/elements provided in HEV 10. For example, the electronic control unit 50 can supply signals to output control device 14A of the engine 14 to effectuate drive control of the engine 14. Electronic control unit 50 can supply signals to inverter 42 for effectuating drive control of the motor 12. Electronic control unit 50 can supply signals to a plurality of electromagnetic control valves in the hydraulic control circuit 40 for speed control of the automatic transmission 18. Electronic control unit 50 may supply signals to a linear solenoid valve in the hydraulic control circuit 40 for engagement control of the clutch 15.

Figure 2B:
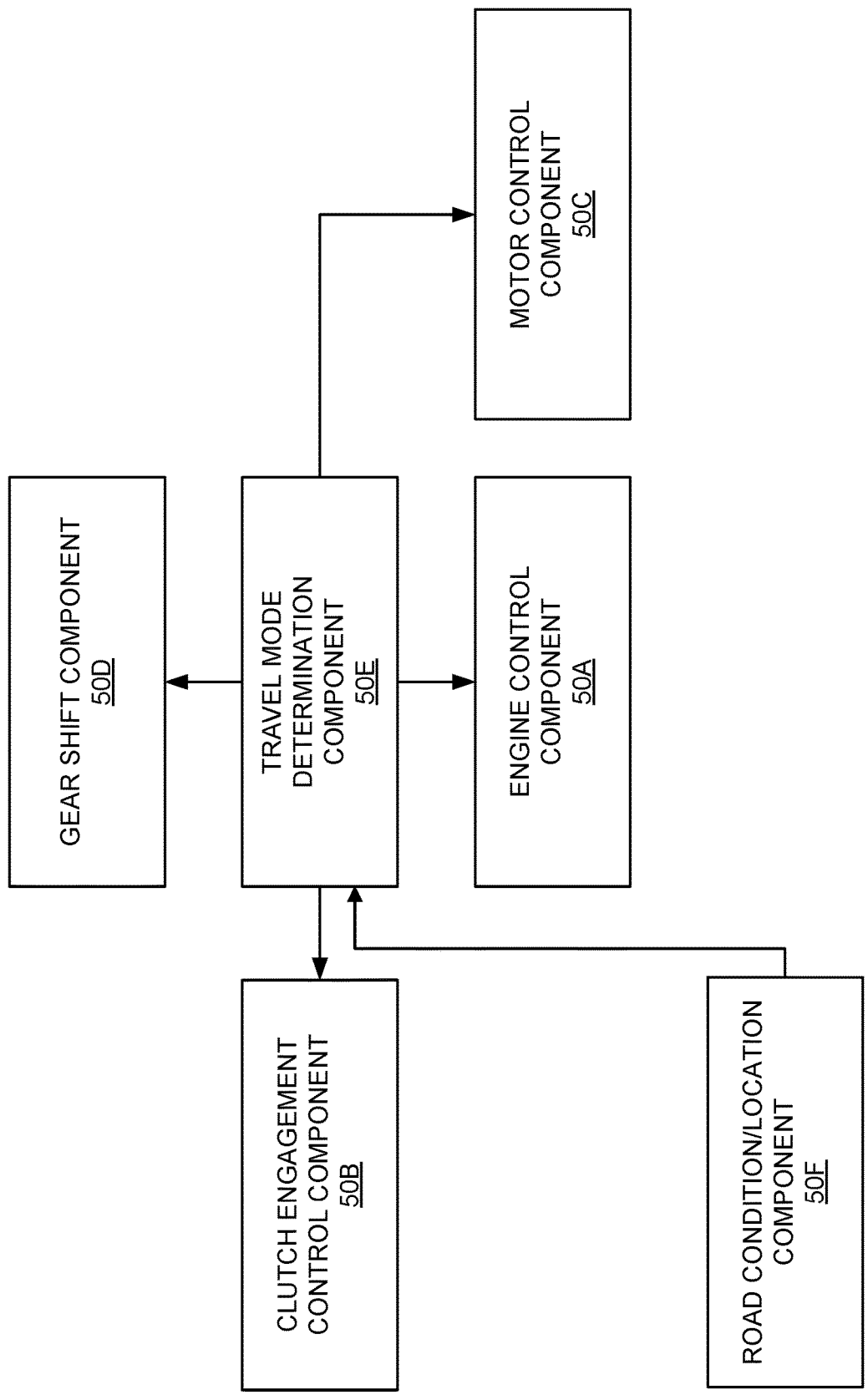
FIG. 2B is a functional block diagram that illustrates example parts of a control function that may be included in the electronic control unit of FIG. 2A.

FIG. 2B is a functional block diagram that illustrates example parts of a control function that may be included in the electronic control unit 50. An engine control component 50A shown in FIG. 2B controls the drive (output torque) of the engine 14 via the output control device 14A. Specifically, engine control component 50A controls output control device 14A by way of a throttle valve opening of an electronic throttle valve, controlling the amount of fuel supplied by the fuel injection device, the ignition timing of the ignition device, etc. Accordingly, electronic control unit 50 controls the manner in which engine 14 provides drive power so that engine output required by engine 14 can be achieved.

Engine control component 50A drives engine 14 in the engine-only and hybrid travel modes. For example, engine control component 50A may control when engine 14 is started, e.g., when switching from EV travel mode to the engine-only travel mode or the hybrid travel mode. This can occur when the HEV is transitioning from the EV travel mode to the hybrid travel mode. Likewise, engine control component 50A may control when engine 14 is shut off, e.g., when switching from engine-only or hybrid travel mode to EV travel mode.

To control engine 14, clutch 15 may be engaged (slip or complete engagement) so as to connect engine 14 to the power transmission path. This can be accomplished by clutch engagement control component 50B, described below. Engine control component 50A can instruct engine 14 to revolve, resulting in an engine revolution speed $N_E$, and the supply of fuel to engine 14 is started via the output control device 14A.

When HEV 10 is to be operated in EV mode, engine control component 50A outputs a control signal(s) to output control device 14A for stopping engine 14. Clutch 15 may be disengaged, and engine 14 is stopped. Moreover, output control device 14A may be commanded to stop the supply of fuel to engine 14.

A motor control component 50C controls actuation of the motor 12 via the inverter 42. Specifically, electric energy is supplied from battery 44 to motor 12 via inverter 42. Motor control component 50C outputs a control signal(s) for driving motor 12 to rotate and generate positive or negative motor torque to obtain the output required of the motor 12. For example, motor control component 50C outputs a control signal(s) to switch inverter 42 so that current is flowing to battery 44 so as to generate negative motor torque such that HEV 10 decelerates.

A gear shift component 50D can output a control signal(s) instructing engagement/disengagement of one or more hydraulic frictional engagement devices through hydraulic control circuit 40 to effectuate a downshift to a lower gear ratio from a current gear ratio. The downshift can be initiated by a control signal(s) from a travel mode determination component 50E, described below.

A travel mode determination component 50E can make determinations regarding a travel mode established in HEV 10 on the basis of present and future driving conditions. A determination can be made regarding which travel mode (EV, engine-only, hybrid) HEV is in on the basis of, e.g., vehicle velocity v, accelerator operation amount $A_{CC}$, battery SOC, brake operation amount B, power demand, engine revolution speed $N_e$, engine torque $T_e$, torque demand, etc. The travel mode determination component may be used to make a determination of which travel mode to utilize using a real-time power split algorithm, further described below.

A road conditions/location component 50F can make determinations regarding a location of HEV 10, as well as road conditions and/or traffic conditions forecasted for the trip. In one embodiment, road conditions/location component 50F may embody a navigation unit commonly found in many modern vehicles, hybrid or otherwise. Road conditions/location component 50F may receive information regarding road conditions from network interface device 48 and/or a GPS receiver, which may be one embodiment of a sensor 52. For example, the location of HEV at any point during its travel can be determined, e.g., by the GPS receiver, and this location can be correlated with road conditions information relevant to that location.

For example, upon startup or during operation of HEV 10, road conditions/location component 50F may determine a route to be traveled is known. The route may be known if an address, point of interest identifier, etc. is provided to a road conditions/location component 50F, for example, by a driver of HEV 10, via navigation system user interface. Road conditions/location component 50F may have or receive maps or map information indicative of the route to be traveled along with road conditions, e.g., any downhill grades present/expected along the route.

Figure 3:
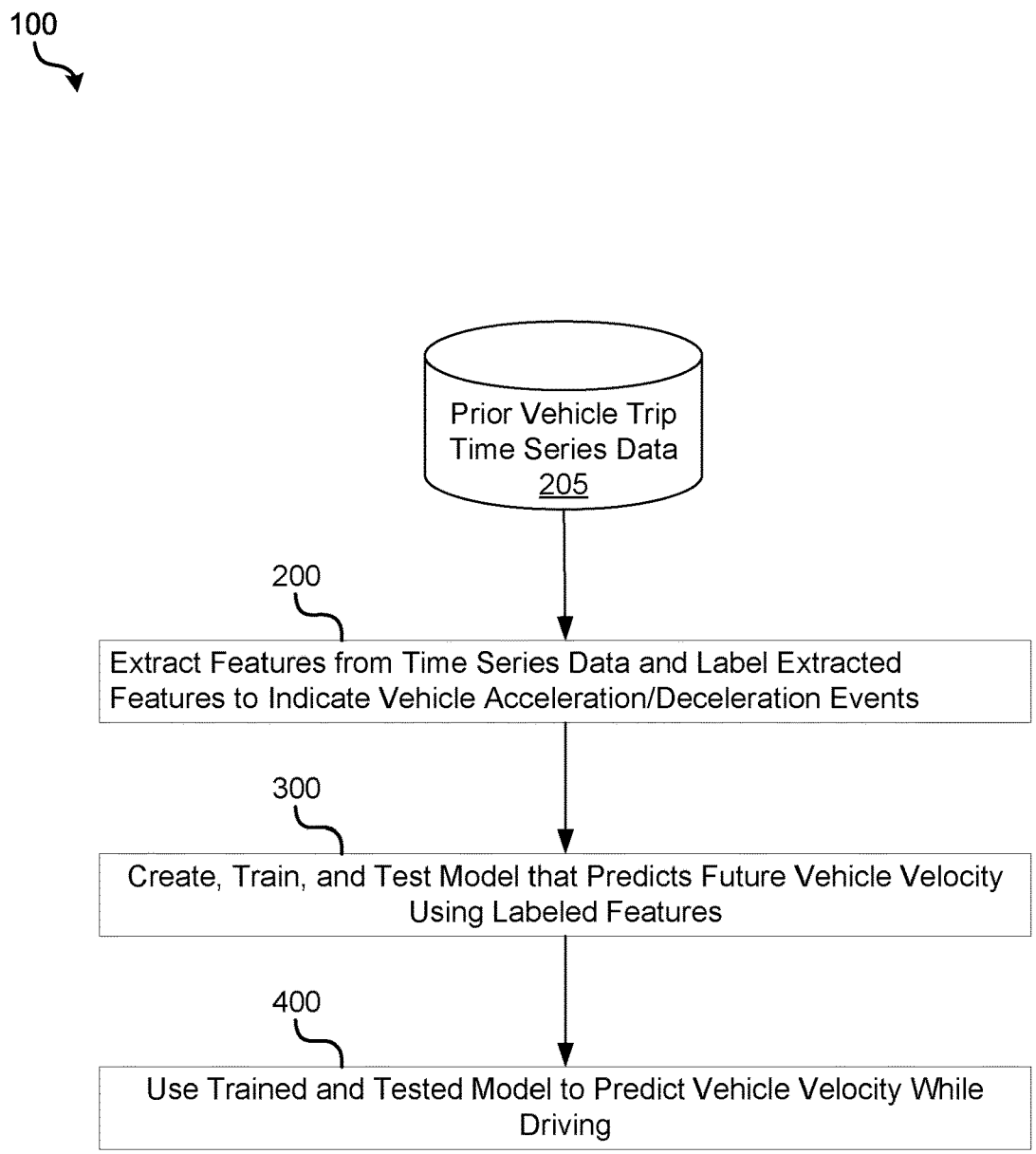
FIG. 3 is an operational flow diagram illustrating an example process flow for creating a learned model with labeled features and using it to predict vehicle velocity, in accordance with the disclosure.

FIG. 3 is an operational flow diagram illustrating an example process flow 100 for creating a learned model with labeled features and using it to predict vehicle velocity, in accordance with the disclosure. More particularly, process flow 100 leverages one or more databases 205 containing prior vehicle trip time series data (e.g., one or more of the following parameters from prior drives: route data, GPS data, radar data, vehicle state data, map data, etc.) to build a model for automatically predicting vehicle velocity while driving. As illustrated, at stage 200, features are extracted from prior vehicle trip time series data and labeled to indicate vehicle acceleration/deceleration events. At stage 300, the labeled features are used to create, train, and test a machine learning model that predicts future vehicle velocity. Once the machine learning model has been sufficiently trained and tested to have an acceptable accuracy, at stage 400, the model is used to predict vehicle velocity while driving. For example, the trained and tested model may be used by an electronic control unit 50 during driving. A more detailed description of the each of the stages 200-400 of process flow 100 follows below with reference to FIGS. 4-14.

Figure 4:
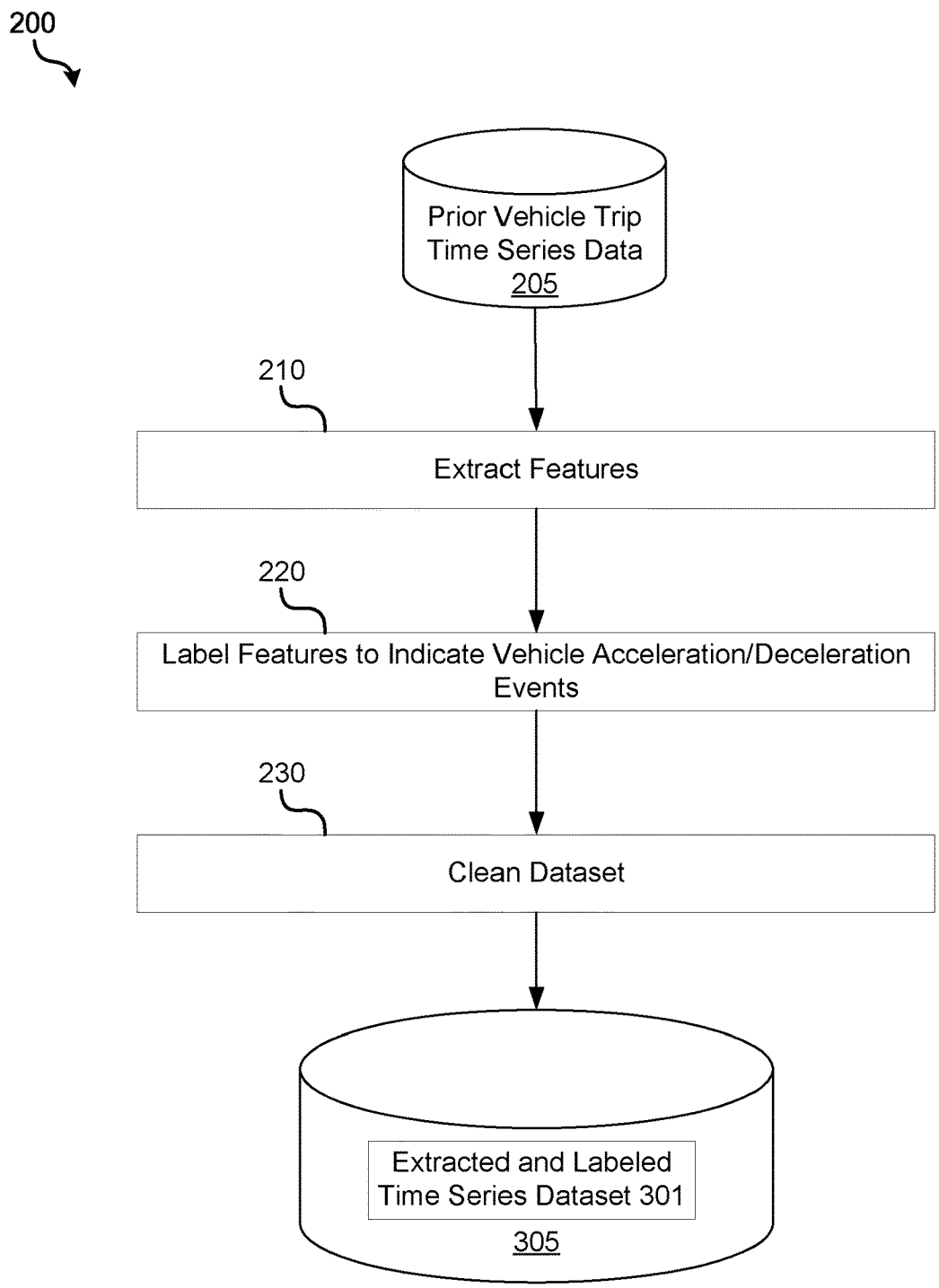
FIG. 4 is an operational flow diagram illustrating an example method for leveraging databases for extracting features from prior vehicle trip time series and labeling them to indicate vehicle acceleration/deceleration events, in accordance with implementations of the disclosure.

FIG. 4 is an operational flow diagram illustrating an example method 200 for leveraging databases 205 for extracting features from prior vehicle trip time series and labeling them to indicate vehicle acceleration/deceleration events, in accordance with implementations of the disclosure. In implementations, one or more operations of method 200 may be implemented by a processor executing instructions stored in a computer-readable medium.

At operation 210, features may be extracted from prior vehicle trip time series that may be indicative of a vehicle's future velocity. As noted above, during the process of creating a learned model for predicting future vehicle velocities, one or more databases 205 containing prior vehicle trip time series data may be leveraged to build a model for automatically predicting vehicle velocity while driving.

Figure 5:
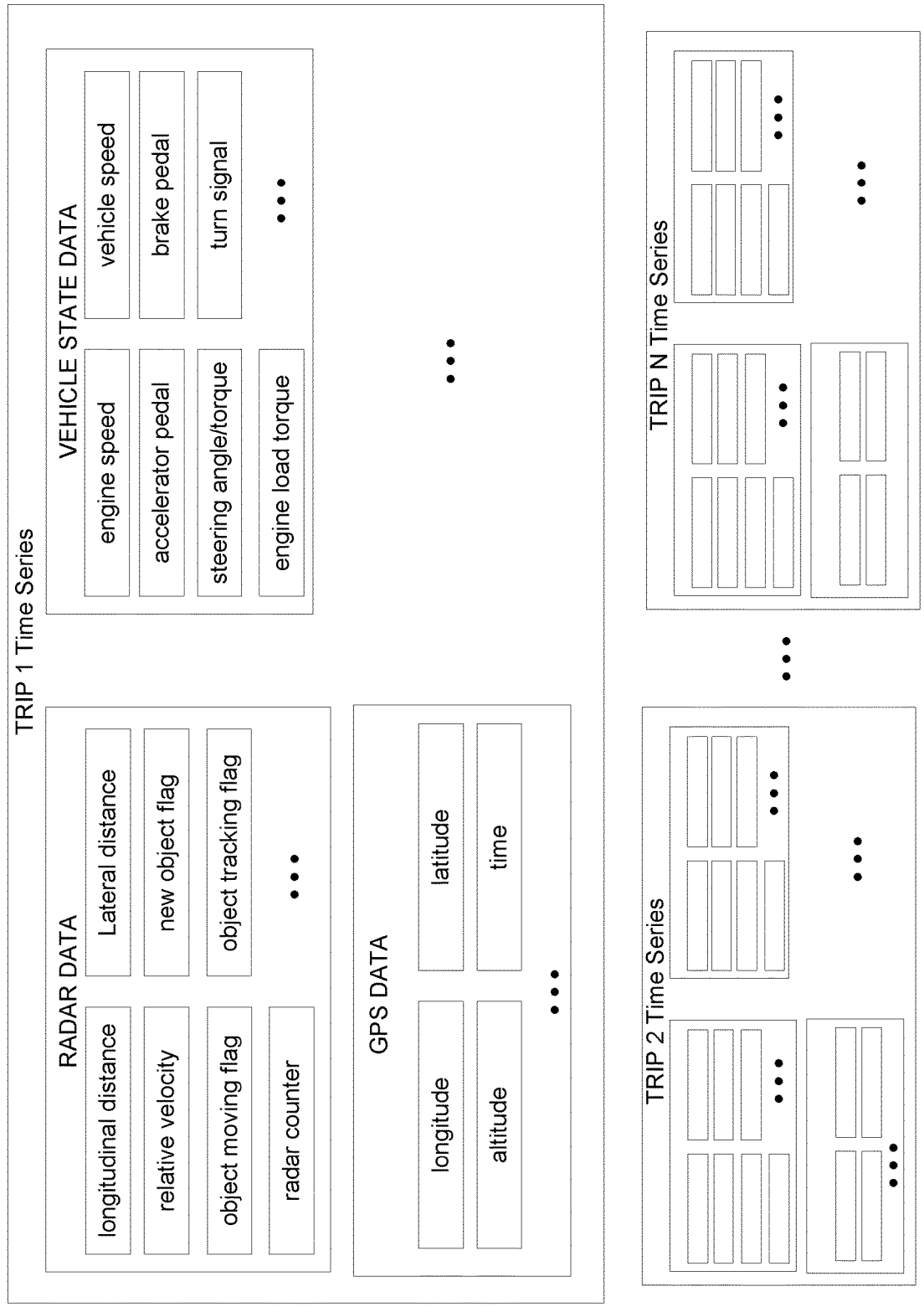
FIG. 5 shows time series data from prior vehicle trips that may be extracted, in accordance with implementations of the disclosure.

By way of illustrative example, FIG. 5 shows time series data from prior vehicle trips that may be extracted. As shown in this example, the time series data may include three primary categories of feature data that is collected over time for each trip: radar data, vehicle state data, and GPS data corresponding to a route driven by the vehicle during a trip. For instance, radar data may include a longitudinal distance, a lateral distance, a relative velocity, a new object flag, an object moving flag, an object tracking flag, a radar counter, and other radar feature data that may be extracted. GPS data may include a longitude, a latitude, an altitude, a time, and other GPS feature data that may be extracted. Vehicle state data may include an engine speed, a vehicle speed, an accelerator pedal state, a brake pedal state, a steering angle/torque state, a turn signal state, an engine load torque state, and other vehicle state data that may be extracted. It should be appreciated that other feature data and/or additional categories of feature data other than that shown in FIG. 5 may be extracted for each trip time series. For example, in some implementations, map service data, intelligent transport system data, and/or other sensor data may be extracted. For example, data may be extracted from other sensors such as LIDAR, ultrasonic sensors, cameras (e.g., color cameras), etc. These sensors may be used in addition to or as an alternative to a radar sensor. In some cases, the number of extracted features that may be indicative of vehicle velocity prediction may range in the hundreds or thousands.

At operation 220, the extracted features are labeled to indicate vehicle/deceleration events in the time series. The labels may be used to indicate one or more of the following acceleration or deceleration events: a vehicle beginning its drive, a vehicle ending its drive, a stop sign, a traffic light, a street corner, a highway corner, a road having a particular radius of curvature and other events that provide an indication that a vehicle will accelerate or deaccelerate.

In some implementations, labeling the extracted features may include: creating a time series vector including a plurality of values, each corresponding to a respective time (e.g., a particular time of the original time series from which data was collected), where each of the values indicates one of the following: an acceleration event is present; a deceleration event is present; or no acceleration or deceleration event is present. For example, values of a time series vector associated with a prior vehicle trip may be set to 1 if acceleration is positive at that instance of time, and 0 if acceleration is negative at that instance of time. As another example, a time series vector may use the value of 1 to indicate instances where a radius of curvature of a road is above 100 m, and 0 otherwise.

In some implementations, labeling the extracted features may include: creating a location series vector including a plurality of values, each corresponding to a respective GPS location (e.g., as collected from a particular time series of a drive), where each of the values indicates one of the following: an acceleration event is present; a deceleration event is present; or no acceleration or deceleration event is present.

Figure 6:
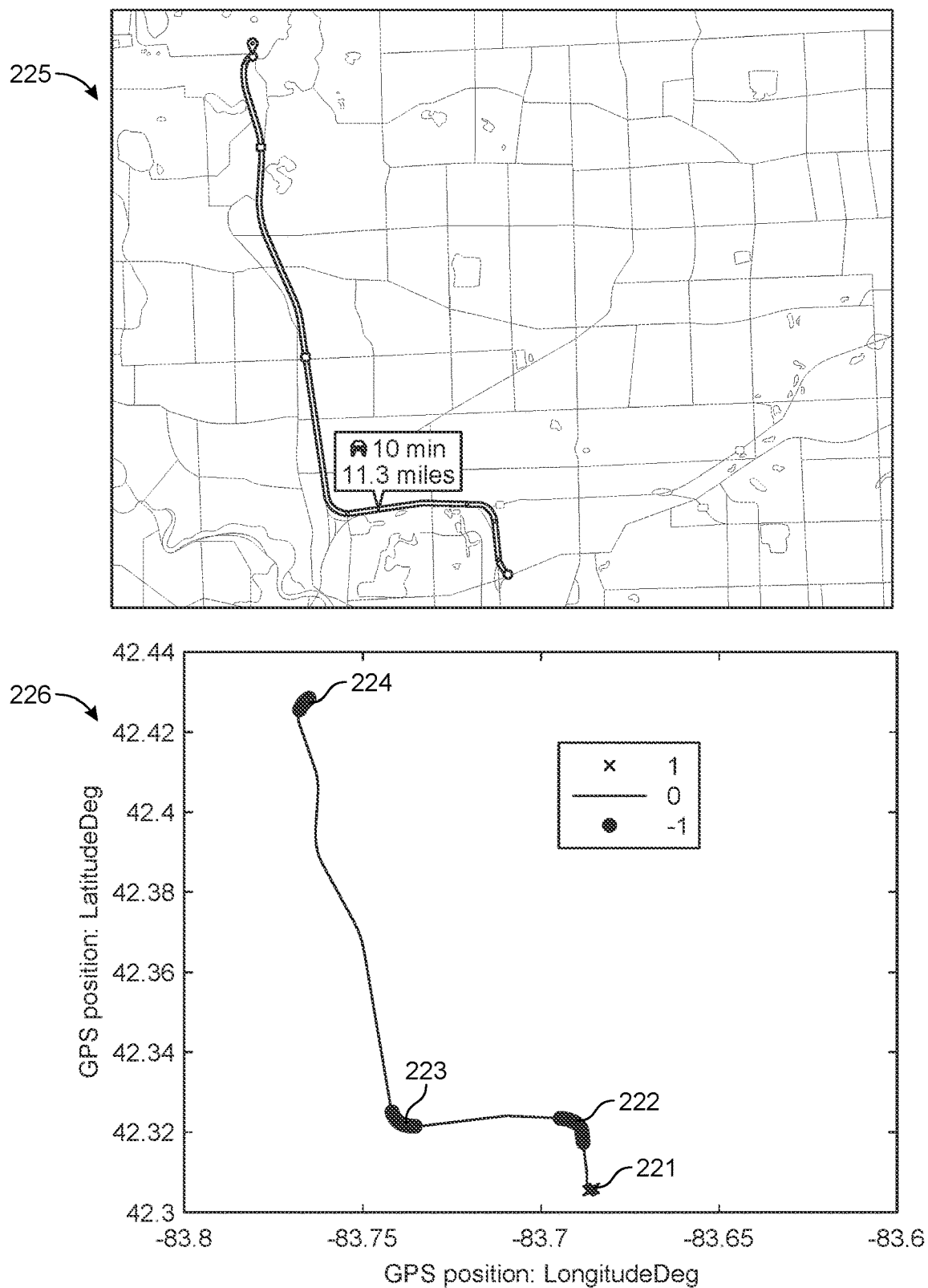
FIG. 6 illustrates a set of labels that were applied to a dataset collected from twenty repeated drives along a highway route by a human driver who drove a rear wheel drive hybrid vehicle, in accordance with the disclosure.

By way of illustrative example, FIG. 6 illustrates a set of labels that were applied to a dataset collected from twenty repeated drives along a highway route by a human driver who drove a rear wheel drive hybrid vehicle. The route is illustrated by map 225. In this example, the dataset included 164 signals (features) in total. In particular, the driving trajectory (vehicle GPS coordinates) and general vehicle longitudinal/lateral states information were available in the dataset. In addition, radar signal channels were available that provided information about surrounding traffic.

As illustrated by plot 226, generated using GPS longitudinal and latitudinal data extracted from the dataset at the beginning of driving 221, the vehicle position trajectory was marked with a first label (label 1); at corners 222-223 and at the end of driving 224, the associated GPS location was marked with a second label (label −1). Other parts of the trajectory were unmarked (label 0). Although normalized labels of 1, 0, and −1 are used in this example, it should be appreciated that other labels may be used.

Figure 7:
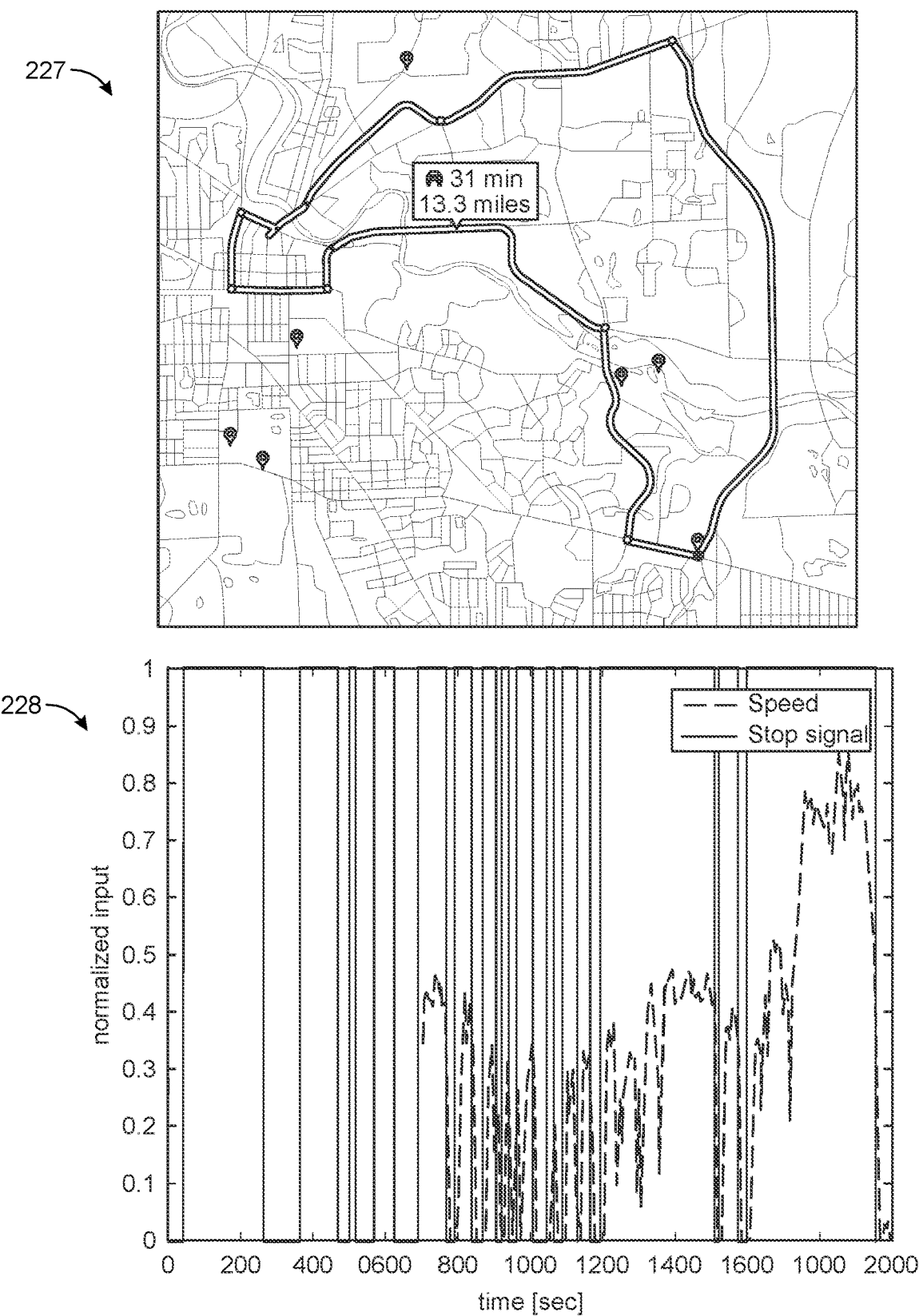
FIG. 7 illustrates a set of labels that were applied to a dataset collected from hundreds of repeated drive cycles along an urban route by three human drivers who drove three vehicles simultaneously, in accordance with the disclosure.

As another example, FIG. 7 illustrates a set of labels that were applied to a dataset collected from hundreds of repeated drive cycles along an urban route by three human drivers who drove three vehicles simultaneously. The route is illustrated by map 227. In this example, the dataset included the aforementioned 164 features. Additionally, in this example, vehicle-to-infrastructure (V2I) information was collected. As illustrated by plot 228, generated using vehicle velocity data extracted from the dataset, when vehicle velocity was non-zero, a label 1 was marked for a given time. Although normalized labels of 1 and 0 are used in this example, it should be appreciated that other labels may be used.

At operation 230, the extracted feature data may be cleaned or normalized. For example, in some implementations, categories of vehicle trip time series feature data may be merged into a single feature. As another example, categories of vehicle trip time series feature data that are less likely to contribute to vehicle velocity prediction may be removed or weighted with less priority from the dataset to focus the subsequent machine learning process on training data including key features that are likely to contribute to vehicle velocity. In some implementations, categories of features may be split into multiple features. In implementations, cleaning operation 230 may be performed concurrently with operations 210-220 or after operations 210-220.

Following extraction and labeling of the features of the prior vehicle trip time series data, they may be stored in a database/storage 305 as an extracted and labeled time series dataset 301 that may be used to train and test one or more machine learning models used to predict vehicle velocity. It should be noted that process 200 may be iterated over time to refine the dataset used to train and test the aforementioned machine learning models. For example, over time it may be discovered that certain features indicative of future vehicle velocity and/or labels indicative of acceleration/deceleration events are more likely to improve vehicle velocity prediction. Further, as new features are discovered or made available (e.g., by collecting additional time series data using new vehicle sensors), the extracted and labeled time series dataset 301 may be expanded. As such, it should be appreciated that the features, categorization, and size of the extracted and labeled time series dataset 301 may change over time.

Figure 8:
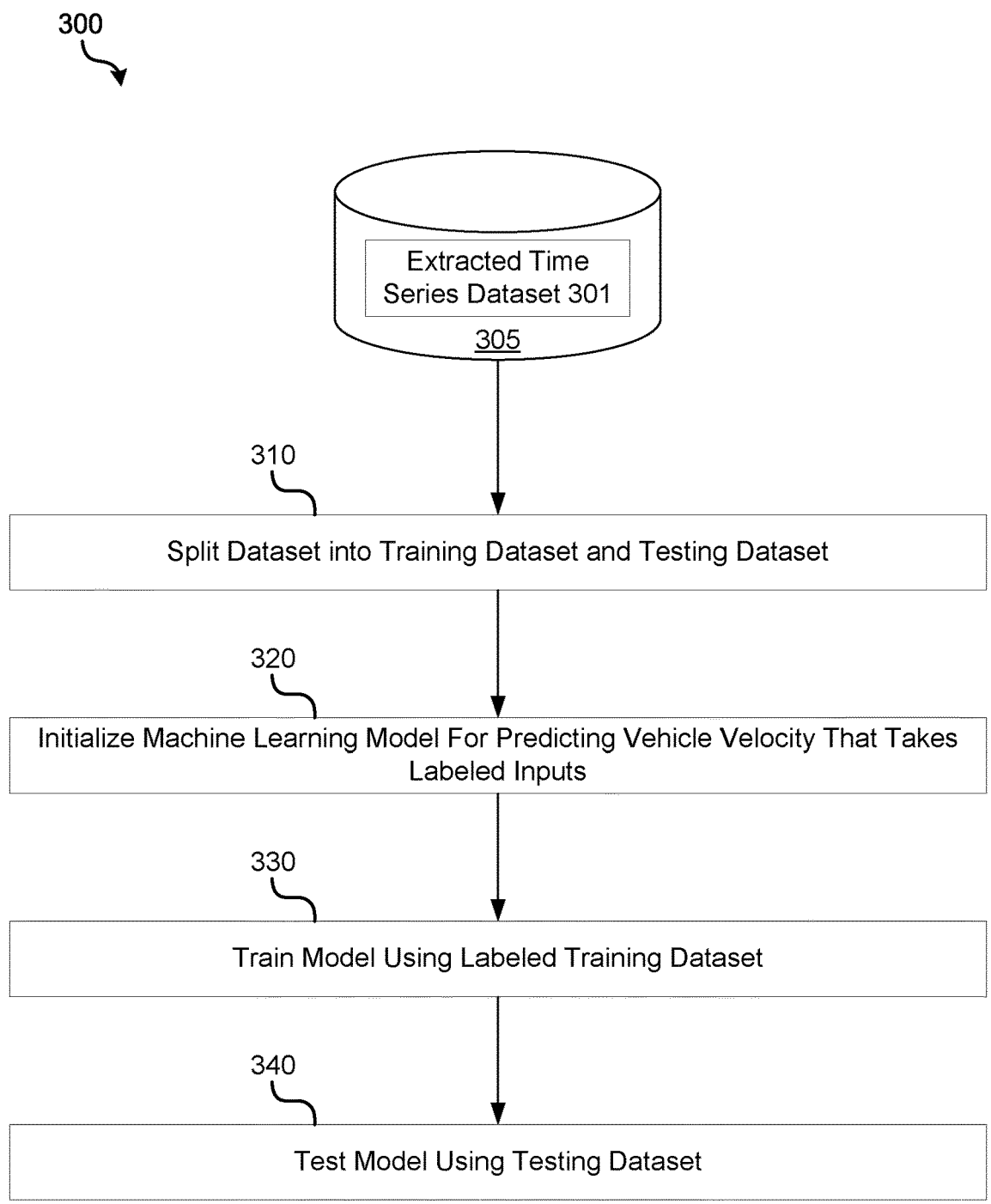
FIG. 8 is an operational flow diagram illustrating an example method for creating, training, and testing one or more models used to predict vehicle velocity, in accordance with implementations of the disclosure.

FIG. 8 is an operational flow diagram illustrating an example method 300 for creating, training, and testing one or more models used to predict vehicle velocity, in accordance with implementations of the disclosure. At operation 310, an extracted and labeled time series dataset 301 stored in a database 305 may be split into a training dataset and testing dataset. In implementations, each of the training dataset and testing dataset may comprise a subset of the extracted and labeled vehicle trip time series. In implementations, the training dataset may comprise a majority of the dataset (e.g., 60%, 70%, 80%, etc.). In implementations, the datasets may be randomized, prior to splitting, to ensure an equal distribution of patterns of data. For example, consider the cases where features for 1000 time series corresponding to 1000 trips where extracted and labeled. In this case, 700 of the extracted and labeled time series may be used for training, and the remaining 300 may be used for testing.

At operation 320, a machine learning model capable of accepting labeled inputs may be initialized to perform training using the training dataset. During initialization, hyperparameters of the algorithms may be set. In some implementations, an ensemble model that combines multiple statistical modeling techniques may be utilized.

In implementations, the model may be initialized by selecting one or more supervised learning algorithms that learn patterns using labeled inputs and known outputs. For example, in some implementations a known input may include labeled features such as GPS data, vehicle state data, or sensor data, and a known output may include vehicle velocity at some point in the future. For example, depending on an application's requirements for predicting vehicle velocity, the model may be trained to predict vehicle velocity 1 second in the future, 5 seconds in the future, or 10 seconds in the future. For example, the following prediction velocity forecasting horizons may be useful in the following applications: i) 1-10 seconds, hybrid energy management; ii) 1-3 seconds, turbo lag compensation; and iii) 100 milliseconds-1 second, diesel engine emission reduction.

In particular implementations, deterministic prediction models such as neural networks may be trained to predict future vehicle velocity. Two examples of deterministic prediction models that may be utilized in accordance with implementations are described in further detail below.

Nonlinear Auto-Regressive with external input (NARX) shallow neural network.

In one implementation, a NARX shallow neural network model may be trained to predict future vehicle velocity. In time series modeling, a nonlinear autoregressive external model (NARX) is a nonlinear autoregressive model which has external inputs. This means that the model relates the current value of an output variable in a time series to both: i) past values of the same output; and ii) current and past values of the external inputs.

Mathematically, the NARX model may be expressed by Equation (1):

$$y(t+1) = F[y(t), y(t-1) \ldots, x(t+1), x(t), x(t-1), \ldots] + e(t+1) \quad (1)$$

where y is the output variable of interest, x is the external input variable and e is noise. The function F is a nonlinear function, which is a neural network. From Equation (1), the NARX model has the capability to include multiple inputs.

Figure 9A:
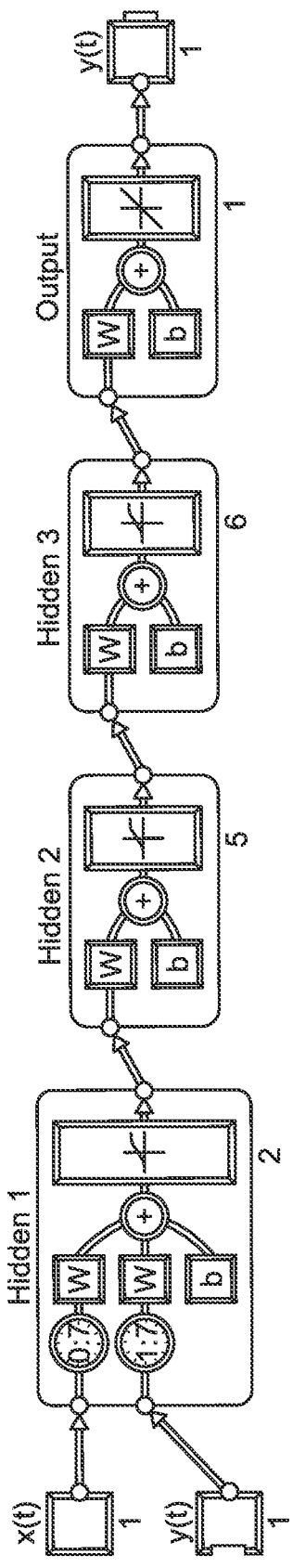
FIG. 9A illustrates the structure of a feed-forward network used for prediction, in accordance with implementations of the disclosure.
Figure 9B:
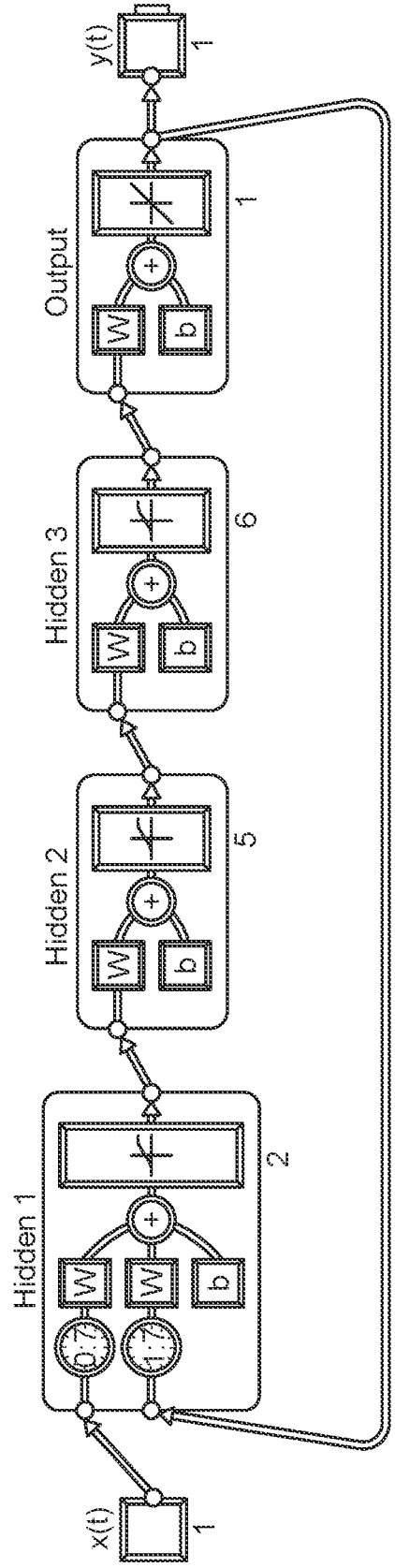
FIG. 9B illustrates the structure of a NARX model used for prediction, in accordance with implementations of the disclosure.

As illustrated by FIG. 9A, the static feed-forward neural network model may be trained for one step ahead prediction or trained directly to predict multiple steps ahead. The NARX structure, illustrated by FIG. 9B, may also be used when the phenomena to be modeled is inherently dynamic.

Long Short-Term Memory (LSTM) deep neural network model.

In another implementation, an LSTM deep neural network model may be trained to predict future vehicle velocity. The LSTM deep neural network is a special kind of a Recurrent Neural Network (RNN) that is capable of learning long-term dependencies from large data sets (i.e., data sets with many inputs) while avoiding the gradient vanishing/exploding issues.

All recurrent neural networks are structured in the form of a chain of repeating modules. In standard RNNs, this repeating module has a very simple structure, such as given by a single 'tan h' function. Similarly, LSTMs also have this chain like structure, but the repeating module is different. Instead of having a single activation function in a neuron, there are three gates (forget gate, input gate and output gate), interacting in a very special way. The LSTM neurons have the ability to deal with time-series data.

Figure 10A:
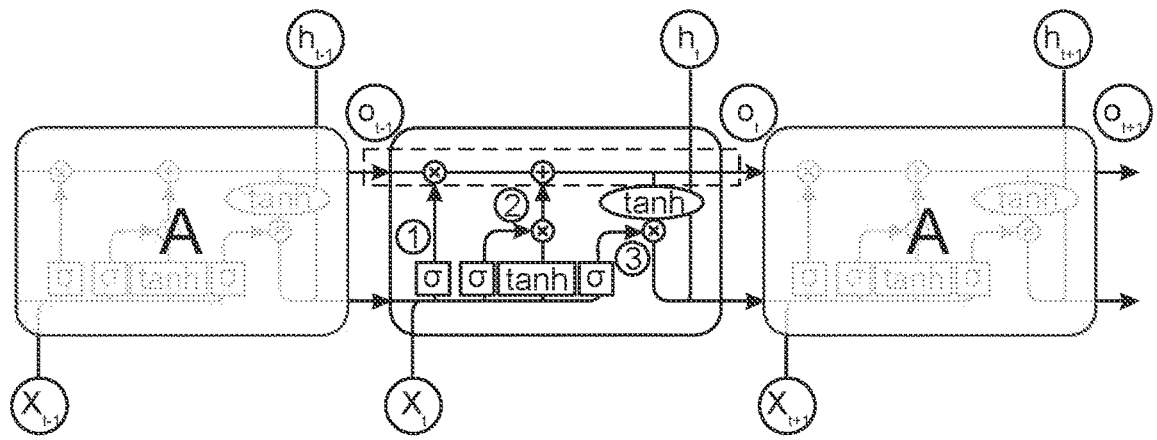
FIG. 10A illustrates the internal structure of an LSTM cell, in accordance with implementations of the disclosure.

FIG. 10A illustrates the internal structure of an LSTM cell, in accordance with implementations. The key to a LSTM cell is the cell state, represented in FIG. 10A by the horizontal line running through the top of the diagram in the dashed box. The LSTM cell has the ability to remove or add information to the cell state, as determined by the structures called a forget gate, an input gate, and an output gate, respectively denoted by (1), (2), and (3) in FIG. 10A. These gates are a way to optionally let information through. They are composed out of a sigmoid neural net layer and a point-wise multiplication operation. The sigmoid layer outputs numbers between zero and one, describing how much of each component should be let through. The detailed formulations of the gates are given as follows.

The forget gate determines how much information from the previous step (state $h_{t-1}$ and output $o_{t-1}$) is forgotten, as denoted by Equation (2):

$$f_t = \sigma(W_f[h_{t-1}, X_t] + b_f) \quad (2)$$

The input gate decides what new information will be stored in the cell state and computes two factors, denoted by Equations (3) and (4):

$$i_t = \sigma(W_i[h_{t-1}, x_t] + b_c) \quad (3)$$

$$\tilde{C}_t = \tan h(W_C[h_{t-1}, x_t] + b_C) \quad (4)$$

This may be interpreted as follows: First, a sigmoid layer called the "input gate layer" decides which values will be updated. Next, a tan h layer creates a vector of new candidate values, $\tilde{C}_t$, that could be added to the state. Then the state update is performed as shown in Equation (5):

$$C_t = f_t * C_{t-1} + i_t * \tilde{C}_t \quad (5)$$

where the LSTM cell drops the information about the old state $C_{t-1}$ and adds the new information as decided in the previous steps.

The output gate determines the final output based on the cell state as shown by Equations (6) and (7):

$$o_t = \sigma(W_o[h_{t-1}, x_t] + b_o) \quad (6)$$

$$h_t = o_t * \tan h(C_t) \quad (7)$$

Figure 10B:
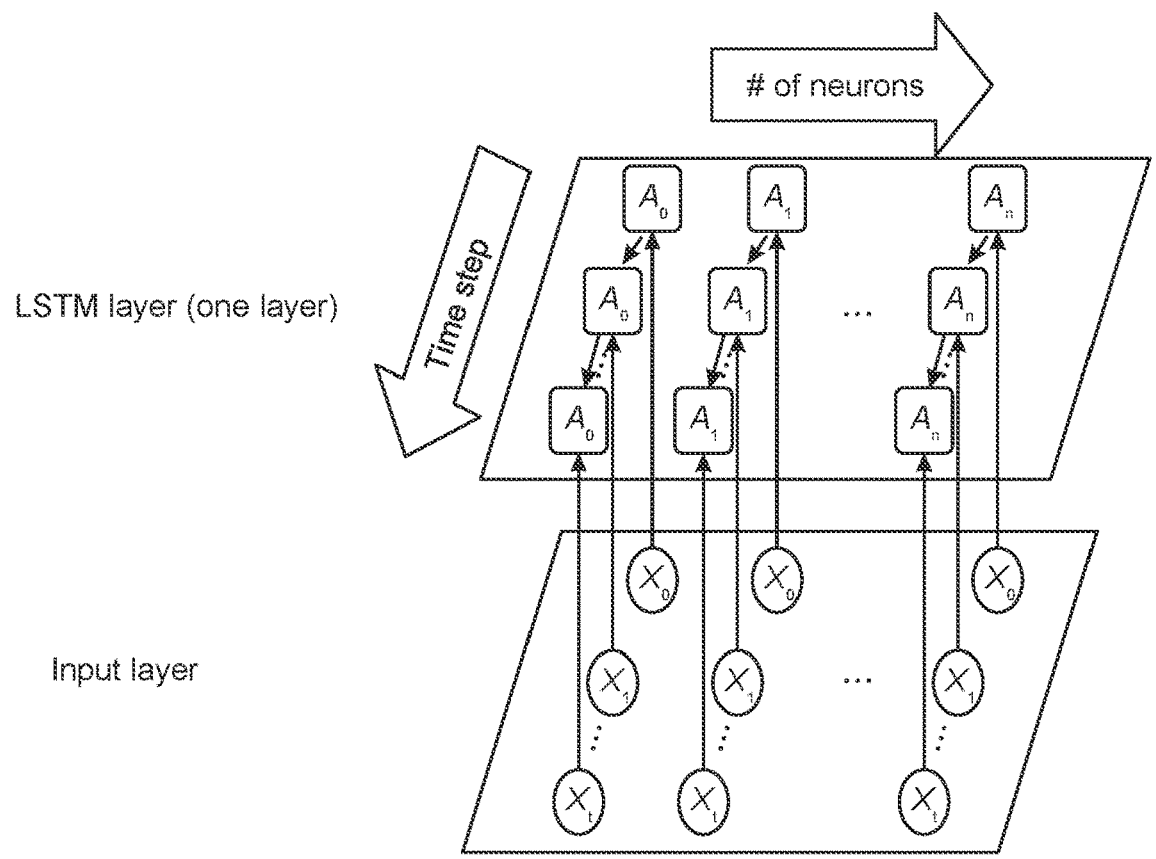
FIG. 10B shows how time series sequence inputs are processed by LSTM, in accordance with implementations of the disclosure.
Figure 10C:
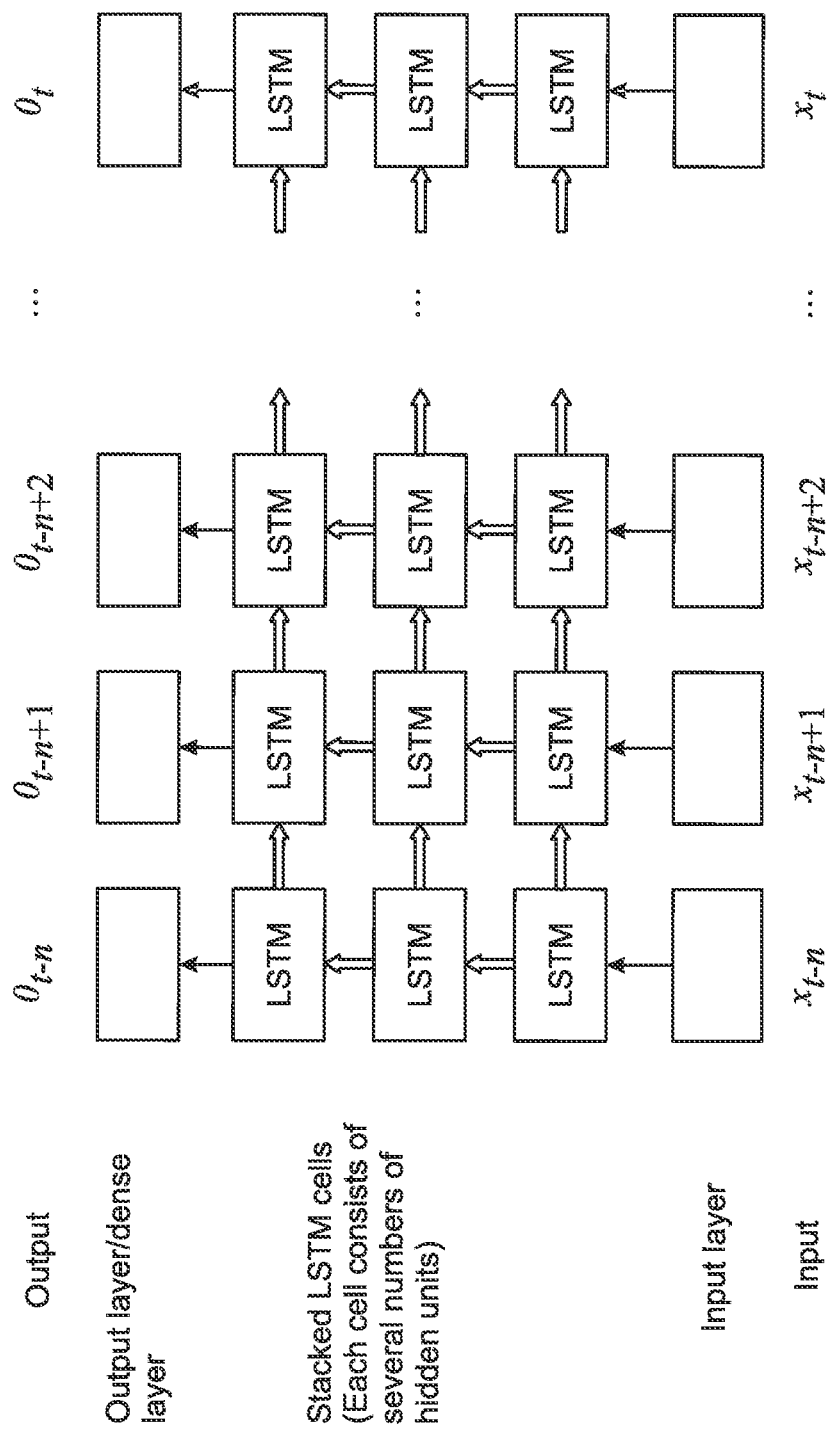
FIG. 10C shows a 5-layer LSTM structure, in accordance with implementations of the disclosure.

FIG. 10B shows how time series sequence inputs are processed by LSTM, in accordance with implementations. $X_0, X_1, \ldots X_t$ are time series sequences inputs. $A_0, A_1, \ldots A_n$ are neurons in the first hidden layer. Each neuron is supposed to capture certain features. FIG. 10C shows a 5-layer LSTM structure, in accordance with implementations. The bottom layer is the input layer. The middle 3 layers are hidden layers with LSTM neurons. Typically, neurons in the lower layer may capture low level features. Neurons in the higher layers may capture abstract features. The top layer is the output layer.

At operation 330, the model may be trained using the labeled training dataset. For example, using one or more of the aforementioned deterministic prediction models (NARX, LSTM), a machine may analyze and determine relationships between vehicle driving features to develop a model that may predict future vehicle velocity some time ahead in the future.

At operation 340, the model developed during training may be tested using the testing dataset. For example, given a dataset having known features and known velocities, the vehicle velocity time series that is predicted by the model (e.g., by looking ahead 10 seconds into the future) may thereafter be compared with the actual, known vehicle velocities measured during the trip. In implementations, the performance of the model may be calculated from testing as an average error score for all predictions. If the average error score is too high, additional iterations of method 300 (and optionally, method 200) may be performed. For example, hyperparameters of the algorithms used in the model may be adjusted, the algorithms of the model may be changed, and/or different features of data may be considered in the model.

In various implementations, further described below, time shift—a measure of time lag in a time series signal—is assessed during testing of the testing dataset.

In some implementations of method 300, a cross validation process may be performed whereby training and testing data is split into various combinations and trained and tested in these various combinations. For example, an exhaustive cross validation or k-fold validation process may be performed.

Simulation Results

To assess prediction results obtained using models learned in accordance with the disclosure, two assessment criteria were considered: Mean Absolute Error (MAE) and time shift. MAE is a measure of difference between two continuous variables. Assume $y_1, \ldots, y_n$ are prediction results. $t_1, \ldots, t_n$ are target values. The MAE is given by Equation (8):

$$MAE(Y_t, T_t) = \frac{\sum_{i=1}^{n} |y_i - t_i|}{n} \quad (8)$$

Smaller MAE means smaller error between prediction results and target values.

Time shift is a measure of time lag in time series signal. It may be expressed by Equation (9):

$$\text{time shift} = \arg\min_{\delta} MAE(Y_{t-\delta}, T_t) \quad (9)$$

where $\delta$ represents a time shift of a predicted vehicle velocity time series. Smaller time shift indicates smaller time lag between prediction results and target values.

Prediction results were assessed against target results using the highway driving dataset described above with reference to FIG. 6 and the urban driving dataset described above with reference to FIG. 7. Vehicle velocity was predicted 10 seconds into the future.

Figure 11A:
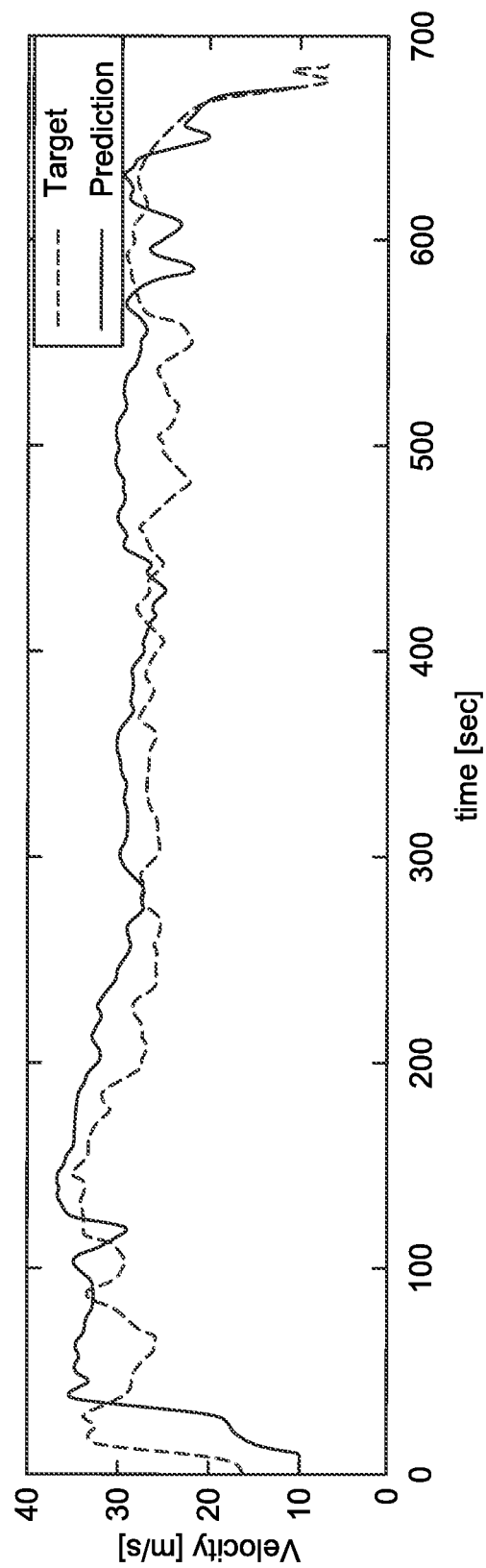
FIG. 11A is a plot illustrating a target velocity time series curve versus a predicted velocity time series curve generated by testing the ARMA model against the highway driving dataset of FIG. 6 without labels.

FIG. 11A is a plot illustrating a target velocity time series curve versus a predicted velocity time series curve generated by testing an Auto-Regressive Moving Average (ARMA) model against the highway driving dataset of FIG. 6 without labels. An ARMA model is an example of a model that may be trained to predict future vehicle velocity. An ARMA model does not take labeled inputs. Given time series data y(t), an ARMA model includes two parts, an autoregressive (AR) part and a moving average (MA) part. The AR part involves regressing the output variable on its own historical values. The MA part involves modeling the error term as a linear combination of the error terms occurring contemporaneously and at various time instants in the past. Mathematically, the ARMA model can be expressed by Equation (10):

$$y(t+1) = \phi_0 y(t) + \phi_1 y(t-1) + \ldots + \\ \phi_p y(t-p) + \theta_0 e(t) + \theta_1 e(t-1) + \ldots + \theta_q e(t-q) \quad (10)$$

where y is the variable of interest, e is the error, p is the order of the autoregressive part and q is the order of the moving average part. The shorthand ARMA(p,q) is often used to designate such a model. As illustrated by FIG. 11A, the ARMA model did not perform well. There are obvious errors and time shifts between the prediction and target.

Figure 11B:
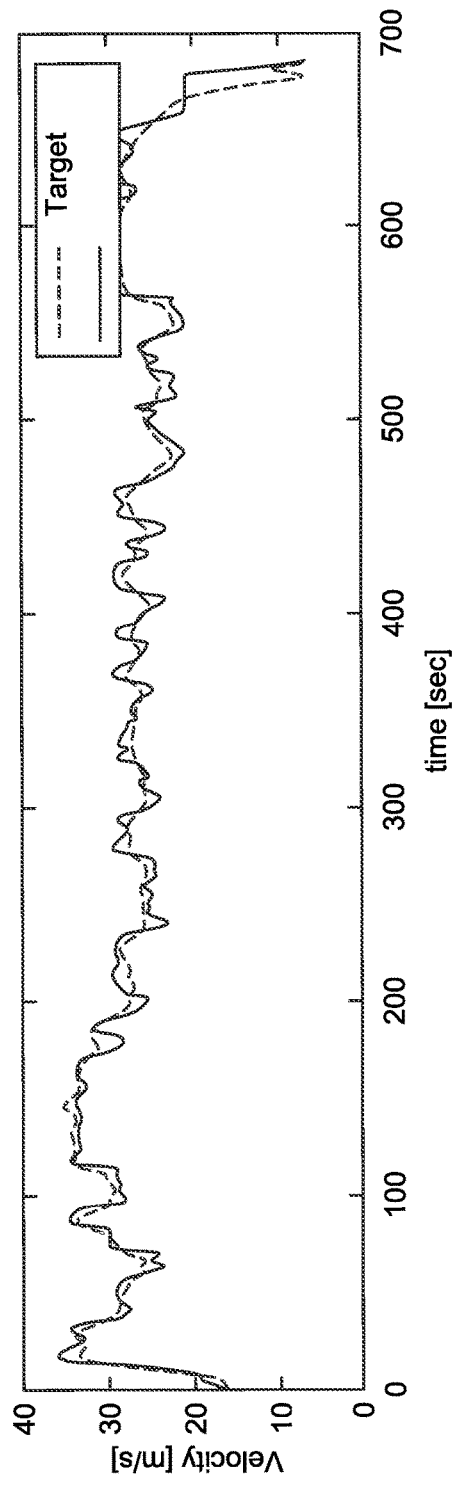
FIG. 11B is a plot illustrating a target velocity time series curve versus a predicted velocity time series curve generated by testing the NARX model against the highway driving dataset of FIG. 6 with labels.

FIG. 11B is a plot illustrating a target velocity time series curve versus a predicted velocity time series curve generated by testing the NARX model against the highway driving dataset of FIG. 6 with labels. During testing, the structure of the NARX model was chosen as a 4-layer neural network with 3 hidden layers. The 3 hidden layers had {2,5,6} neurons, respectively. The activation function was chosen as 'tan h'. The NARX model was developed in Matlab with a function Narxnet. The error and time shift between the prediction and the target were on average smaller than the ARMA model for 10 second prediction results.

Figure 11C:
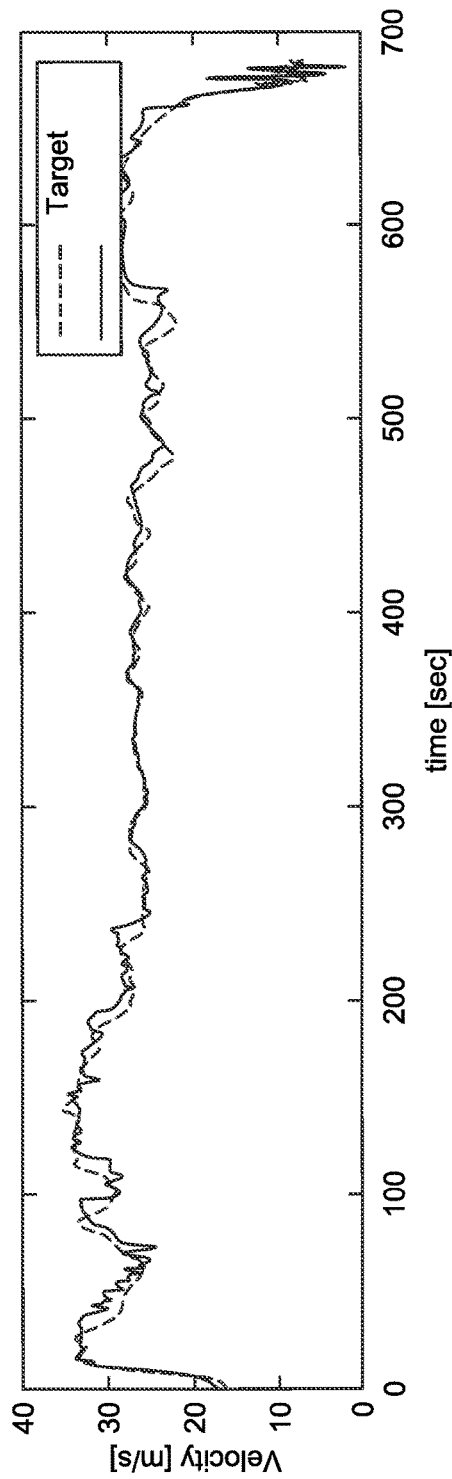
FIG. 11C is a plot illustrating a target velocity time series curve versus a predicted velocity time series curve generated by testing the LSTM model against the highway driving dataset of FIG. 6 with labels.

FIG. 11C is a plot illustrating a target velocity time series curve versus a predicted velocity time series curve generated by testing the LSTM model against the highway driving dataset of FIG. 6 with labels. During testing, Tensorflow was used to develop the LSTM. The structure of the LSTM was chosen as a 4-layer neural network with three hidden layers. The three hidden layers had {64,32,13} neurons. The activation function was chosen as "ReLu", to avoid gradient vanishing and accelerate the training process. Regularization and dropout layer were considered to avoid overfitting. As illustrated, the error and time shift between the prediction and the target were small for 10 second prediction results. The error and time shift only exist in some regions.

Using the highway driving dataset of FIG. 6, a comparison of different machine learning models yielded the following results, illustrated by Table 1, shown below:

TABLE 1

Comparison between different models

| Model | 10 sec. prediction MAE [m/s] | Time shift [sec] | Labeled Inputs? |
|---|---|---|---|
| ARMA | 3.6616 | 10 | No |
| NARX | 1.1389 | 7 | Yes |
| LSTM | 0.9067 | 4 | Yes |
| MC | 3.8579 | 10 | No |
| CLG | 2.0861 | 8 | No |

Although the ARMA model is the most widely used time series prediction model in finance, it did not perform well for vehicle velocity prediction in highway driving. The problem of predicting vehicle velocity does not have features such as seasonality in the market, which is a strength of the ARMA model. The NARX model achieved the second-best prediction performance. It decreased MAE and time shift. LSTM achieved the best prediction performance and smallest time shift. Stochastic prediction models developed for vehicle velocity prediction, including a Markov Chain (MC) model and a Conditional Linear Gaussian (CLG) model, were also tested. The stochastic prediction models did not perform well for vehicle velocity prediction on the highway driving data set.

Figure 12:
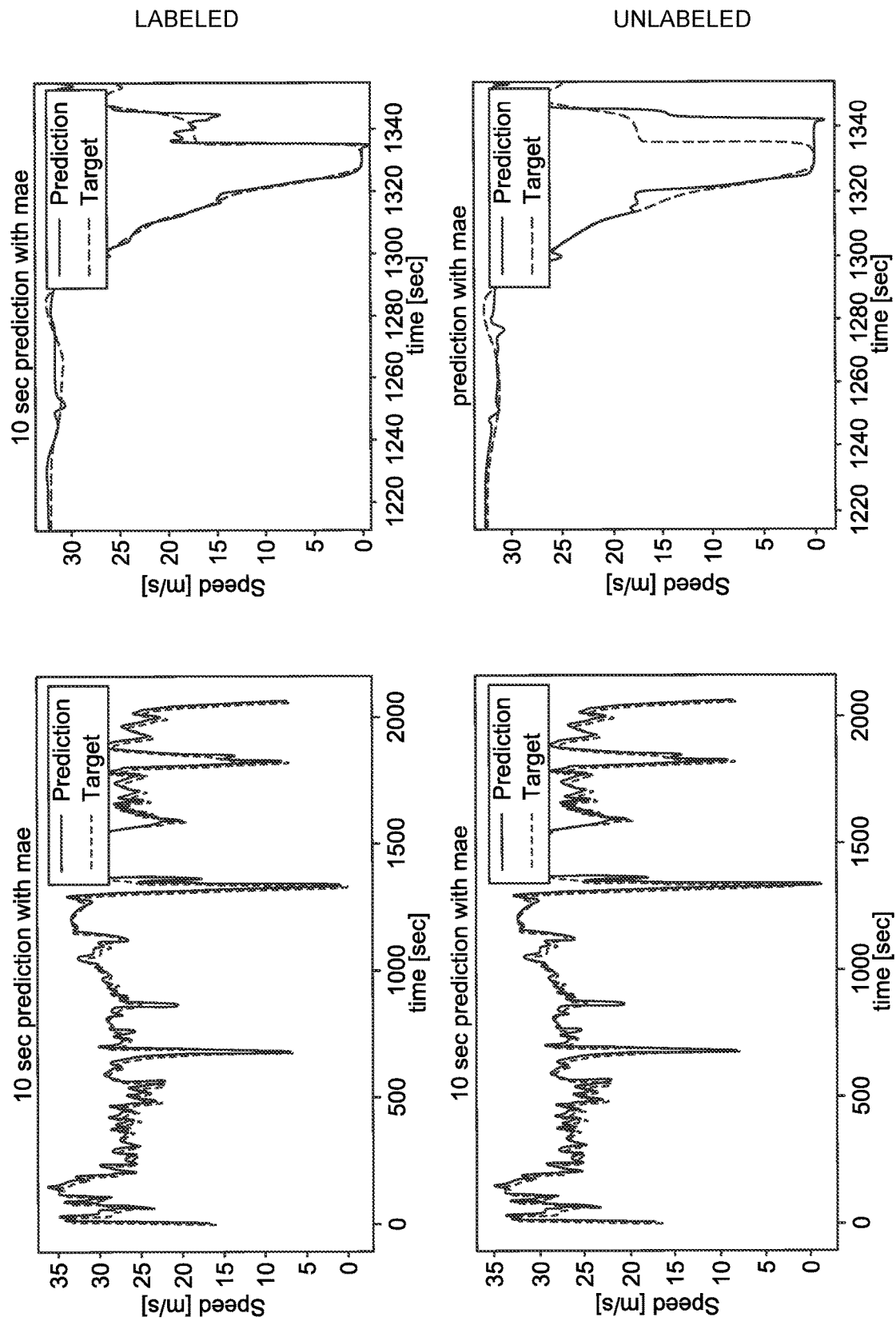
FIG. 12 shows two different plots illustrating a target velocity time series curve versus a predicted velocity time series curve generated by testing the LSTM model against the highway driving dataset of FIG. 6, using labeled inputs and unlabeled inputs.

FIG. 12 shows two different plots illustrating a target velocity time series curve versus a predicted velocity time series curve generated by testing the LSTM model against the highway driving dataset of FIG. 6, using labeled inputs and unlabeled inputs. The top left plot was generated using the map labels described above with reference to FIG. 6 as inputs. The bottom left plot was generated without labeled inputs. The top right plot is zoomed into a section of the top left plot. The bottom right plot is zoomed into a section of the bottom left plot. The top plot had a 10 second prediction MAE in m/s of 0.90. The bottom plot had a 10 second prediction MAE in m/s of 1.09. As illustrated, the use of labeled inputs (in this example, map labels) greatly reduced time shift and MAE.

Figure 13:
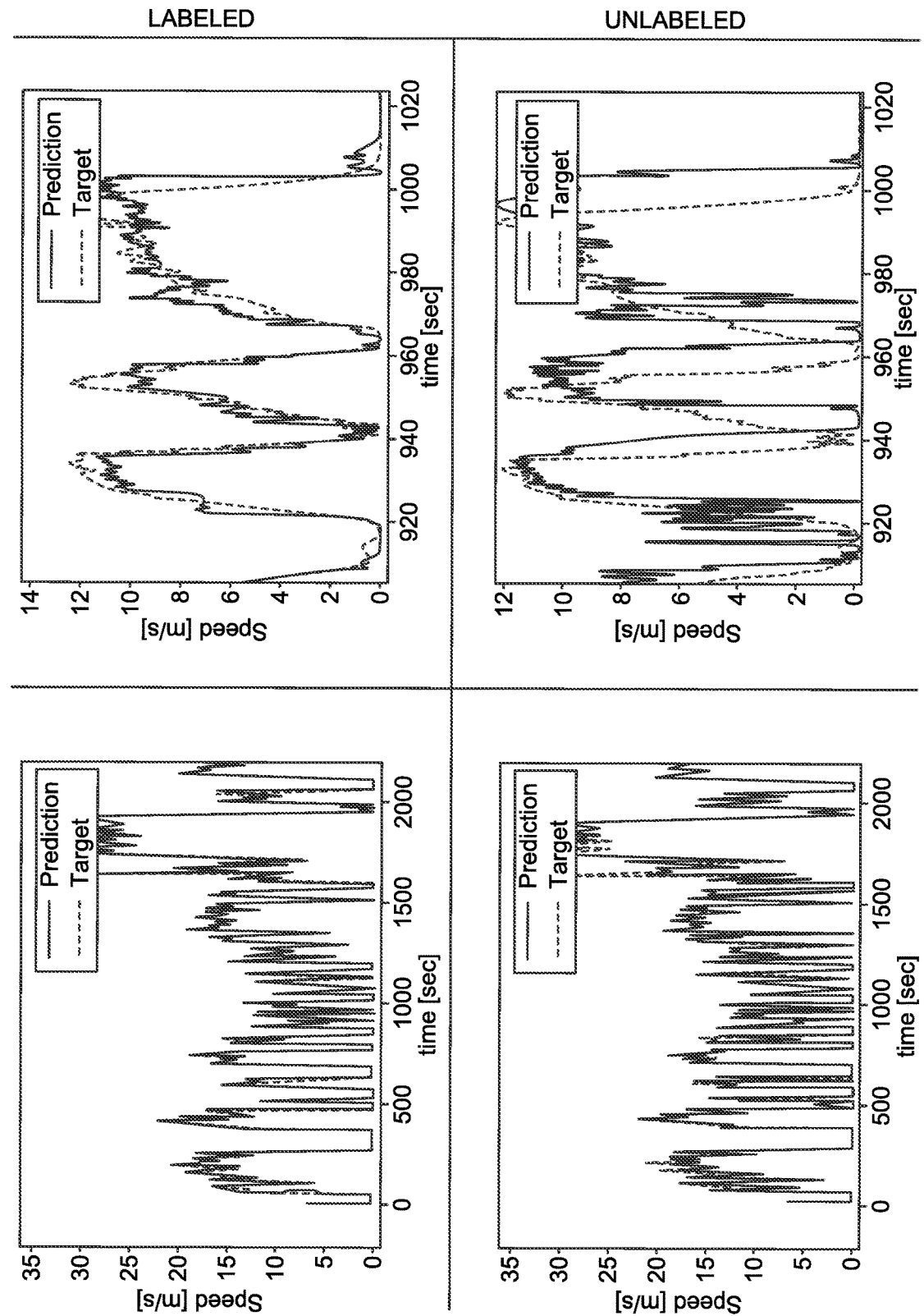
FIG. 13 shows two different plots illustrating a target velocity time series curve versus a predicted velocity time series curve generated by testing the LSTM model against the urban driving dataset of FIG. 7, using labeled inputs and unlabeled inputs.

FIG. 13 shows two different plots illustrating a target velocity time series curve versus a predicted velocity time series curve generated by testing the LSTM model against the urban driving dataset of FIG. 7, using labeled inputs and unlabeled inputs. The top left plot was generated using the labels described above with reference to FIG. 7 as inputs. The bottom left plot was generated without labeled inputs. The top right plot is zoomed into a section of the top left plot. The bottom right plot is zoomed into a section of the bottom left plot. The top plot had a 10 second prediction MAE in m/s of 1.07. The bottom plot had a 10 second prediction MAE in m/s of 1.66. Table 2, below, shows the results in tabular format.

TABLE 2

LSTM prediction results for urban dataset

| Inputs | 10 sec. prediction MAE [m/s] | Time shift [sec] |
|---|---|---|
| Urban data set | 1.66 | 5 |
| Urban data set + labels | 1.07 | 0 |

As illustrated, the use of labeled inputs improved the results significantly.

Figure 14:
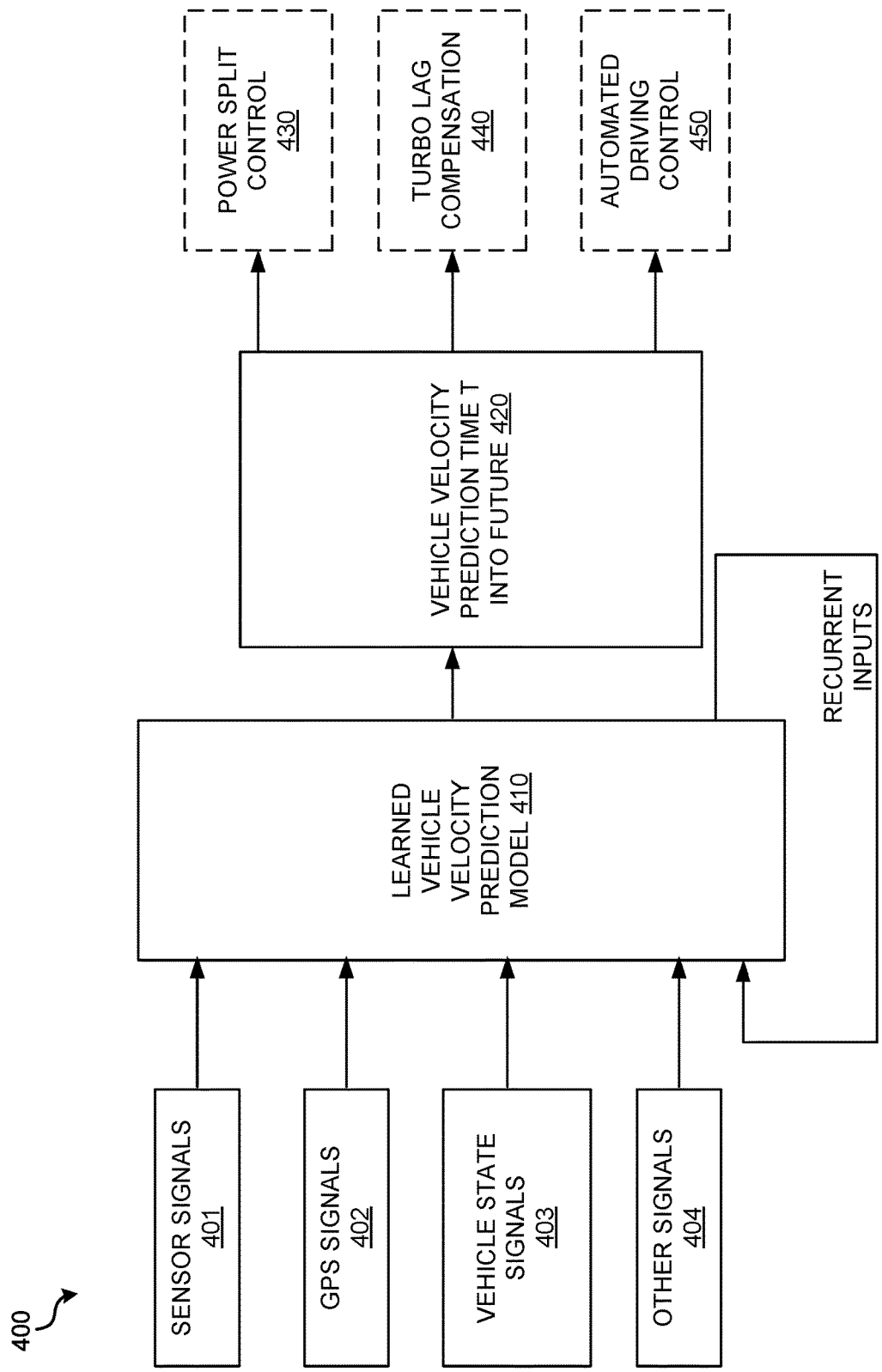
FIG. 14 illustrates a process flow for using a learned vehicle velocity prediction model to predict vehicle velocity while driving, where the model was trained using labeled inputs indicative of acceleration/deceleration events, in accordance with the disclosure.

FIG. 14 illustrates a process flow 400 for using a learned vehicle velocity prediction model to predict vehicle velocity while driving, where the model was trained using labeled inputs indicative of acceleration/deceleration events, in accordance with the disclosure. As illustrated, during a drive, the vehicle is configured to receive sensor signals 401 that may provide data on preceding traffic (e.g., radar, lidar, or other sensors), GPS signals 402, vehicle state signals 403, and other signals 404, and use these signals as inputs to a learned vehicle velocity prediction model 410 that is used at operation 420 to predict vehicle velocity some time T (e.g., 1-10 seconds) into the future. The learned vehicle velocity prediction model 410 may be implemented as an algorithm that is stored in an electronic control unit of the vehicle. In some implementations, the sensor signals 401 may be preprocessed prior to being provided to the learned vehicle velocity prediction model 410. Depending on the type of vehicle using the model, the prediction time of the model, and the application for which the prediction model is needed, the predicted future velocity may be used for power split control 430 (e.g., in HEVs), for turbo lag compensation (e.g., in ICE vehicles), or for automated driving control (e.g., in all vehicles).

In this case, labels of acceleration or deceleration events may be stored in a map (e.g., as labels corresponding to stop sign locations or road curvature) and retrieved by a control unit of the vehicle to provide labeled inputs during the drive. Alternatively, labels may be generated dynamically (e.g., from knowledge of traffic light signals or from maps of traffic conditions).

Figure 15:
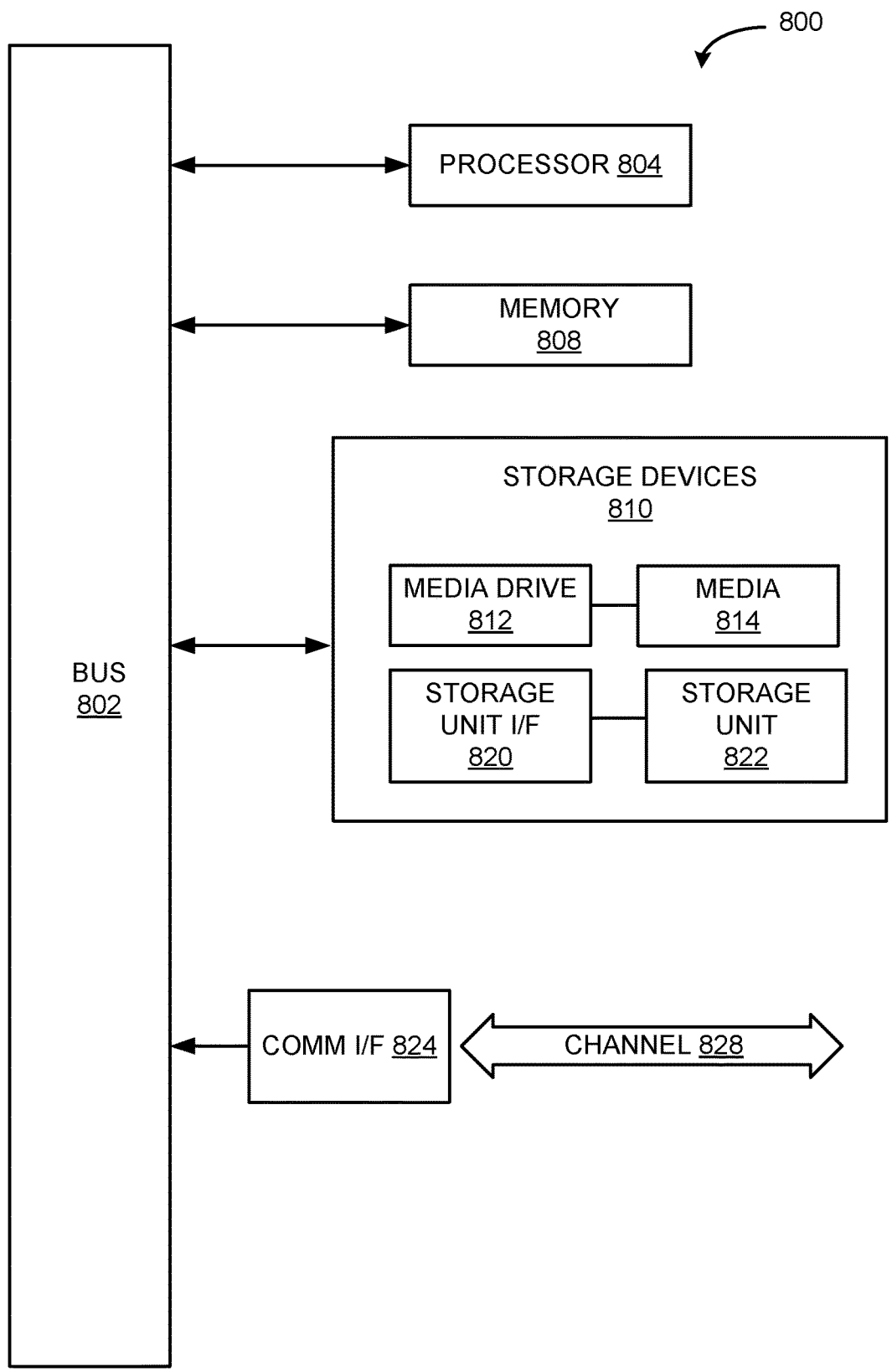
FIG. 15 is an example computing component that may be used to implement various features of embodiments described in the present disclosure.

As used herein, the term component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 15. Various embodiments are described in terms of this example-computing component 800. After reading this description, it will become apparent to a person skilled in the relevant art how to implement the application using other computing components or architectures.

Referring now to FIG. 15, computing component 800 may represent, for example, computing or processing capabilities found within computer processing units or any other type of special-purpose or general-purpose computing devices as may be desirable or appropriate for a given application or environment. Computing component 800 might also represent computing capabilities embedded within or otherwise available to a given device. For example, a computing component might be found in other electronic devices such as, for example, electronic devices that might include some form of processing capability.

Computing component 800 might include, for example, one or more processors, controllers, control components, or other processing devices. This can include a processor, and/or any one or more of the components making up electronic control device 50 and/or its component parts, hydraulic control circuit 40, or other components or elements of vehicle, e.g., signal sensors, etc. Processor 804 might be implemented using a general-purpose or special-purpose processing engine such as, for example, a microprocessor, controller, or other control logic. Processor 804 may be connected to a bus 802. However, any communication medium can be used to facilitate interaction with other components of computing component 800 or to communicate externally.

Computing component 800 might also include one or more memory components, simply referred to herein as main memory 808. For example, random access memory (RAM) or other dynamic memory, might be used for storing information and instructions to be executed by processor 804. Main memory 808 might also be used for storing temporary variables or other intermediate information during execution of instructions to be executed by processor 804. Computing component 800 might likewise include a read only memory ("ROM") or other static storage device coupled to bus 802 for storing static information and instructions for processor 804.

The computing component 800 might also include one or more various forms of information storage mechanism 810, which might include, for example, a media drive 812 and a storage unit interface 820. The media drive 812 might include a drive or other mechanism to support fixed or removable storage media 814. For example, a hard disk drive, a solid state drive, a magnetic tape drive, an optical drive, a compact disc (CD), digital video disc (DVD) drive, or Blu-ray drive (R or RW), or other removable or fixed media drive might be provided. Storage media 814 might include, for example, a hard disk, a solid state drive, an integrated circuit assembly, magnetic tape, cartridge, optical disk, a CD, DVD, or Blu-ray. Storage media 814 may be any other fixed or removable medium that is read by, written to or accessed by media drive 812. As these examples illustrate, the storage media 814 can include a computer usable storage medium having stored therein computer software or data.

In alternative embodiments, information storage mechanism 810 might include other similar instrumentalities for allowing computer programs or other instructions or data to be loaded into computing component 800. Such instrumentalities might include, for example, a fixed or removable storage unit 822 and an interface 820. Examples of such storage units 822 and interfaces 820 can include a program cartridge and cartridge interface, a removable memory (for example, a flash memory or other removable memory component) and memory slot. Other examples may include a PCMCIA slot and card, and other fixed or removable storage units 822 and interfaces 820 that allow software and data to be transferred from storage unit 822 to computing component 800.

Computing component 800 might also include a communications interface 824. Communications interface 824 might be used to allow software and data to be transferred between computing component 800 and external devices. Examples of communications interface 824 might include a modem or softmodem, a network interface (such as an Ethernet, network interface card, WiMedia, IEEE 802.XX or other interface). Other examples include a communications port (such as for example, a USB port, IR port, RS232 port Bluetooth® interface, or other port), or other communications interface. Software/data transferred via communications interface 824 may be carried on signals, which can be electronic, electromagnetic (which includes optical) or other signals capable of being exchanged by a given communications interface 824. These signals might be provided to communications interface 824 via a channel 828. Channel 828 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer readable medium", "computer usable medium" and "computer program medium" are used to generally refer to non-transitory media, volatile or non-volatile, such as, for example, memory 808, storage unit 820, and media 814. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 800 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method, comprising:
receiving a plurality of time series datasets, each of the plurality of time series datasets comprising sensor data, global positioning system (GPS) data, and vehicle state data collected over time during a vehicle trip;
extracting features from each of the plurality of time series datasets that are indicative of a future velocity of a vehicle, the extracted features comprising the sensor data, the GPS and the vehicle state data;
creating a time series vector comprising a plurality of values corresponding to a respective time, or creating a location series vector comprising a plurality of values corresponding to a respective location, wherein each of the plurality of values of the time series or location series indicates one of the following:
an acceleration event is present;
a deceleration event is present; or
no acceleration or deceleration event is present;
labeling the extracted features of each of the plurality of time series datasets to indicate the acceleration event or the deceleration event; and
after labeling the extracted features of each of the plurality of time series datasets to indicate the acceleration event or the deceleration event, using at least a subset of the extracted and labeled time series datasets to train a machine learning model that predicts vehicle velocity some time into the future.

2. The method of claim 1, wherein labeling the extracted features of each of the plurality of time series datasets to indicate the acceleration event or the deceleration event, comprises:
labeling the extracted features to indicate one or more of the following events:
a vehicle beginning its drive, a vehicle ending its drive, a stop sign, a traffic light, a street corner, a highway corner, and a road having a particular radius of curvature.

3. The method of claim 2, wherein each of the plurality of values of the location series is normalized to 1, 0, or 1.

4. The method of claim 1, further comprising:
after labeling the extracted features of each of the plurality of time series datasets, splitting the extracted and labeled time series datasets into a training dataset and a testing dataset, wherein the extracted and labeled time series datasets of the training dataset are used to train the machine learning model; and
after training the machine learning model, testing the trained machine learning model using at least the extracted and labeled time series datasets of the testing dataset, wherein testing the trained machine learning model comprises comparing target vehicle velocities against vehicle velocities predicted by the trained model.

5. The method of claim 4, wherein testing the machine learning model comprises measuring a time shift between the target vehicle velocities and the vehicle velocities predicted by the trained model.

6. The method of claim 5, wherein the time shift is measured based on:

$$\text{time shift} = \arg\min_{\delta} \ MAE(Y_{t-\delta}, T_t),$$

wherein $\delta$ represents a time shift of a predicted vehicle velocity time series, and wherein MAE represents a mean absolute error given by:

$$MAE(Y_t, T_t) = \frac{\sum_{i=1}^{n} |y_i - t_i|}{n}$$

wherein $y_1, \ldots, y_n$ are vehicle velocities predicted some time into the future n times using the machine learning model, and $t_1, \ldots, t_n$ are measured vehicle velocities corresponding to the times when the vehicle velocities are predicted.

7. The method of claim 5, wherein the machine learning model trained to predict vehicle velocity some time into the future comprises a nonlinear auto-regressive with external input shallow neural network model.

8. The method of claim 5, wherein the machine learning model trained to predict vehicle velocity some time into the future comprises a long short-term memory (LSTM) deep neural network model.

9. The method of claim 8, further comprising: configuring a control unit of a vehicle to use a prediction algorithm corresponding to the trained and tested machine learning model to predict vehicle velocity 1 to 10 seconds into the future while driving.

10. The method of claim 9, wherein the control unit is configured to receive as inputs to the prediction algorithm:
the GPS data collected by a GPS unit of the vehicle;
the sensor data of preceding traffic collected by a preceding traffic sensor unit of the vehicle;
the vehicle state data collected by one or more vehicle state sensors of the vehicle; and
labels providing an indication of an acceleration or deceleration event at a particular time or location.

11. The method of claim 10, further comprising the control unit of the vehicle extracting from stored map data the labels that are the inputs to the prediction algorithm that provide an indication of the acceleration event or the deceleration event.

12. The method of claim 10, further comprising the control unit of the vehicle dynamically generating the labels that are the inputs to the prediction algorithm that provide an indication of the acceleration event or the deceleration event.

13. The method of claim 1, wherein the time series vector cell value equals 1 where a radius of curvature of a road is greater than a predetermined value and 0 otherwise.

14. A non-transitory computer-readable medium having executable instructions stored thereon that, when executed by a processor, cause the processor to perform operations of:
receiving a plurality of time series datasets, each of the plurality of time series datasets comprising sensor data, global positioning system (GPS) data, and vehicle state data collected over time during a vehicle trip;
extracting features from each of the plurality of time series datasets that are indicative of a future velocity of a vehicle, the extracted features comprising the sensor data, the GPS and the vehicle state data;
creating a time series vector comprising a plurality of values corresponding to a respective time, or creating a location series vector comprising a plurality of values corresponding to a respective location, wherein each of the plurality of values of the time series or location series indicates one of the following:
an acceleration event is present;
a deceleration event is present; or
no acceleration or deceleration event is present;
labeling the extracted features of each of the plurality of time series datasets to indicate the acceleration event or the deceleration event; and
after labeling the extracted features of each of the plurality of time series datasets to indicate the acceleration event or the deceleration event, using at least a subset of the extracted and labeled time series datasets to train a machine learning model that predicts vehicle velocity some time into the future.

15. The non-transitory computer-readable medium of claim 14, wherein the instructions, when executed by the processor, further perform operations of:
after labeling the extracted features of each of the plurality of time series datasets, splitting the extracted and labeled time series datasets into a training dataset and a testing dataset, wherein the extracted and labeled time series datasets of the training dataset are used to train the machine learning model; and
after training the machine learning model, testing the trained machine learning model using at least the extracted and labeled time series datasets of the testing dataset, wherein testing the trained machine learning model comprises comparing target vehicle velocities against vehicle velocities predicted by the trained model, wherein testing the machine learning model comprises measuring a time shift between the target vehicle velocities and the vehicle velocities predicted by the trained model.

16. The non-transitory computer-readable medium of claim 14, wherein the machine learning model trained to predict vehicle velocity some time into the future comprises a long short-term memory (LSTM) deep neural network model; or a nonlinear auto-regressive with external input shallow neural network model.

17. A vehicle, comprising:
a GPS sensor;
a vehicle state sensor;
a preceding traffic sensor to collect data of traffic preceding the vehicle; and
an electronic control unit to iterate operations of:
receiving GPS data generated using the GPS sensor;
receiving vehicle state sensor data generated using the vehicle state sensor;
receiving preceding traffic data generated using the preceding traffic sensor;
obtain labels providing an indication of an acceleration event or deceleration event at a particular time or location; and
providing the received GPS data, the received vehicle state sensor data, the received preceding traffic data, and the obtained labels as an input to a vehicle velocity prediction algorithm corresponding to a trained and tested vehicle velocity prediction model, wherein the vehicle velocity prediction algorithm is configured to create a time series vector comprising a plurality of values corresponding to a respective time, or create a location series vector comprising a plurality of values corresponding to a respective location, wherein each of the plurality of values of the time series or location series indicates one of the following:
the acceleration event is present;
the deceleration event is present; or
no acceleration or deceleration event is present; and
predicting vehicle velocity some time into the future using the vehicle velocity prediction algorithm.

18. The vehicle of claim 17, wherein obtaining labels providing an indication of the acceleration event or the deceleration event at the particular time or the location, comprises:
the electronic control unit of the vehicle extracting the labels from stored map data; or
the electronic control unit of the vehicle dynamically generating the labels.

* * * * *